United States Patent
Rössl

(10) Patent No.: US 11,875,083 B2
(45) Date of Patent: Jan. 16, 2024

(54) ELECTRONIC SHELF LABEL SYSTEM WITH ENERGY SUPPLY FOR LONG-TERM OPERATION OF CONSUMERS OF A SHELF LABEL

(71) Applicant: SES-Imagotag GmbH, Fernitz-Mellach (AT)

(72) Inventor: Andreas Rössl, Graz (AT)

(73) Assignee: SES-IMAGOTAG GmbH, Fernitz-Mellach (AT)

( * ) Notice: Subject to any disclaimer, the term of this patent is extended or adjusted under 35 U.S.C. 154(b) by 0 days.

(21) Appl. No.: 17/786,587

(22) PCT Filed: Dec. 23, 2019

(86) PCT No.: PCT/EP2019/086991
§ 371 (c)(1),
(2) Date: Jun. 17, 2022

(87) PCT Pub. No.: WO2021/129932
PCT Pub. Date: Jul. 1, 2021

(65) Prior Publication Data
US 2023/0012967 A1    Jan. 19, 2023

(51) Int. Cl.
*G06F 3/147* (2006.01)
*H02J 50/10* (2016.01)

(52) U.S. Cl.
CPC .............. *G06F 3/147* (2013.01); *H02J 50/10* (2016.02); *G09G 2330/021* (2013.01); *G09G 2380/04* (2013.01)

(58) Field of Classification Search
CPC ...... G09G 2380/04; H02J 50/10; H02J 50/12; G06F 1/1632; G06F 1/181
See application file for complete search history.

(56) References Cited

U.S. PATENT DOCUMENTS

| 2015/0015403 A1* | 1/2015 | LeMaistre | G01R 19/155 340/654 |
| 2015/0116296 A1* | 4/2015 | Greene | H02J 50/12 345/211 |
| 2015/0169907 A1* | 6/2015 | Chang | H02J 7/0047 340/10.6 |

* cited by examiner

Primary Examiner — Sanjiv D. Patel
(74) Attorney, Agent, or Firm — Dennemeyer & Associates, LLC.

(57) ABSTRACT

A method for operating an electronic shelf label system, wherein the system comprises shelf labels fastened to shelf edge strips, wherein the shelf labels are designed such that they can be supplied with energy in a contactless manner, and the shelf edge strip comprises a supply device for contactlessly supplying energy to the shelf labels fastened on it, and the shelf edge strip comprises at least one conductor loop, wherein the conductor loop is a constituent of the supply device of the shelf edge strip and the conductor loop is used for emitting a signal, which can be generated by the supply device, for the purpose of the said supply of energy of shelf labels positioned on the shelf edge strip in a manner corresponding to the conductor loop, wherein according to the method, the said signal is generated with the aid of the supply device and emitted via the conductor loop and the respective shelf label positioned corresponding to the conductor loop stores electrical energy, which is transmitted with the aid of the signal from the supply device to the shelf label, in a rechargeable long-term energy storage device and uses the same for its operation outside of a time period where the signal is present.

8 Claims, 6 Drawing Sheets

ELECTRONIC SHELF LABEL SYSTEM WITH ENERGY SUPPLY FOR LONG-TERM OPERATION OF CONSUMERS OF A SHELF LABEL

CROSS-REFERENCE TO RELATED APPLICATIONS

This is a 35 U.S.C. 371 National Stage Patent Application of International Application No. PCT/EP2019/086991, filed Dec. 23, 2019 which is hereby incorporated by reference in its entirety.

TECHNICAL FIELD

The invention relates to an electronic shelf label system with energy supply via a shelf edge strip for the long-term operation of consumers of a shelf label.

BACKGROUND

An electronic shelf label system for displaying information with the aid of electronic shelf label displays, referred to below as ESL system for short, wherein ESL stands for "electronic shelf label", with energy supply via a shelf edge strip is known, for example, from international patent application WO 2017/153481 A1. In this known ESL system, a shelf edge strip to which the ESLs are attached is equipped with electrical conductor tracks which are connected to a power supply unit for electrically supplying the ESLs. The ESLs comprise on their rear side resilient contacts, with which the conductor tracks are contacted in order to connect the ESLs electrically to the power supply unit.

However, the known energy supply is relatively expensive, because a multiplicity of in particular individual mechanical components must be provided in each ESL and in each shelf edge strip. These mechanical components are subject to natural wear. In addition, the mechanical components can become dirty or even damaged if not handled properly. This can lead to malfunctions during operation. The mechanical components are also associated with considerable additional outlay in both production and maintenance, which is necessary during operation to avoid the aforementioned problems. The known system also has the limitation that the ESLs cannot be positioned or displaced along the shelf edge strip in any desired manner.

The object of the invention is to provide an improved ESL system in which the aforementioned problems are overcome.

SUMMARY OF THE INVENTION

This object is achieved by a method for operating an electronic shelf label system, wherein the system comprises shelf labels fastened to shelf edge strips, wherein the shelf labels are designed such that they can be supplied with energy in a contactless manner, and the shelf edge strip comprises a supply device for contactlessly supplying energy to the shelf labels fastened on it, and the shelf edge strip comprises at least one conductor loop, wherein the conductor loop is a constituent of the supply device of the shelf edge strip and the conductor loop is used for emitting a signal, which can be generated by the supply device, for the purpose of the said supply of energy of shelf labels positioned on the shelf edge strip in a manner corresponding to the conductor loop, wherein according to the method, the said signal is generated with the aid of the supply device and emitted via the conductor loop and the respective shelf label positioned corresponding to the conductor loop stores electrical energy, which is transmitted with the aid of the signal from the supply device to the shelf label, in a rechargeable long-term energy storage device and uses the same for its operation outside of a time period where the signal is present.

This object is furthermore achieved by an electronic shelf label system, which comprises shelf edge strips and shelf labels fastened thereto, wherein the shelf labels are designed such that they can be supplied with energy in a contactless manner, and wherein each shelf edge strip comprises a supply device for contactlessly supplying energy to the shelf labels fastened to it and each of the shelf edge strips comprises at least one conductor loop, wherein the conductor loop is a constituent of the supply device of the shelf edge strip and the conductor loop is used for emitting a signal, which can be generated by the supply device, for the purpose of the said supply of energy to shelf labels positioned on the shelf edge strip in a manner corresponding to the conductor loop, wherein the shelf labels comprise a rechargeable long-term energy storage device, and wherein the shelf labels are designed for storing the energy transmitted to them from the supply device with the aid of the signal in the long-term energy storage device and also for using the energy stored in the long-term energy storage device for their operation outside of the time period where the signal is present.

In a departure from known measures, using the measures according to the invention is associated with a complete dispensation with contact or wired supply of energy to the shelf labels on a shelf edge strip. This brings with it the advantage that energy is supplied to the shelf label completely without mechanical contacts and the problems associated therewith. The system can thus be produced more cost-effectively and, owing to the avoided, particularly maintenance-prone, mechanical components, can in fact be operated without maintenance with respect to these mechanical components.

Furthermore, the required attention is also paid to the aspect of energy efficiency in the system. Whenever the signal is emitted by the supply device, this signal is used at the shelf labels positioned along the relevant conductor loop for charging the long-term energy storage device. This measure ensures that the power required for generating and emitting the signal, which power must be provided with the aid of the supply device, particularly the battery thereof, is also used optimally outside of the supply device. Here, it should be considered that such an electronic shelf label system may comprise a multiplicity of shelf edge strips. Thus, for example, up to 100,000 such shelf edge strips may be installed in larger supermarkets. As each of these shelf edge strips is equipped with a, particularly battery-operated, supply device, this means that 100,000 such supply devices must also be supplied primarily with electrical power or energy. If the power output with the aid of the signal were not converted as completely as possible to energy storage on the side of the shelf label receiving the signal, the energy component required for emitting the signal from the supply device would, figuratively speaking, "fizzle out", that is to say be wasted, due to radiation of the signal.

The energy required for emitting the signal can be provided on the one hand by a, particularly rechargeable, battery installed in the supply device. In this design, unused radiation losses caused by the emitted signal lead to a shortened battery life and to increased maintenance costs or in the case of rechargeable batteries to more frequent charging cycles, which in turn shortens the lifetime of the batteries.

The aspect of energy wastage is also to be considered however in a design in which the supply device is supplied with the aid of a power supply unit, which for its part is connected to a conventional power grid. In this case also, without systematic intermediate storage or buffering of the energy transmitted with the signal on the side of the shelf labels, translated to the large number of supply devices, there would be a considerable discrepancy between the energy supplied to the system and the energy actually used in the system for electronic processing. Here, as explained, a considerable portion of this discrepancy would be attributable to a useless radiation of the signals.

The same also applies mutatis mutandis for supplying the supply device by means of "power over WiFi".

However, the storage of the energy transmitted with the aid of the signal in the rechargeable long-term energy storage device of the shelf labels is also associated with a further important advantage. Namely, this measure makes it possible for the shelf label to be active not only during the time period where the signal is present, but rather to be in operation completely separately from the energy supply currently taking place by means of the signal, even outside the time period where the signal is present. This in turn forms the basis for a wide range of novel embodiments and possible applications of the shelf labels, which are no longer limited or bound to the signal, which usually occurs as rarely as possible for energy saving reasons, this is additionally explained in detail in the following.

According to the preferred embodiment, the long-term energy storage device can be realized by a "supercapacitor", "supercap" for short, also referred to as an "ultracapacitor". Of course, rechargeable batteries can also be used. The advantage of the supercapacitors mentioned lies in the following facts, however. A supercapacitor, also termed an ultracapacitor, is a high-power capacitor with a capacitance that is much higher than in other capacitors, but the capacitor has lower voltage limits and bridges the gap between electrolyte capacitors and rechargeable batteries. It typically stores 10 to 100 times more energy per unit volume or mass than electrolyte capacitors, can receive and output charge much faster than batteries, and tolerates many more charging and discharging cycles than rechargeable batteries. In the present use scenario, the signal can occur as rarely as possible owing to the energy saving considerations mentioned and then also be present during a shortest possible time period. However, with the aid of the supercapacitors, even this relatively short occurrence of the signal can be used optimally for rapid and above all sufficient energy saving for later operation outside of the time period where the signal is present.

Notwithstanding the fact that small designs are used during the integration of a supercapacitor into a shelf label, it is mentioned by way of example here that at the time of the application, supercapacitors and ultracapacitors are commercially available e.g. from a large number of companies, such as e.g. AVX, Cellergy, Elna, Ioxus, Maxell, Nichicon, Panasonic, PowerStor.

Also, it is mentioned at this point that the "battery operation" of the supply device is likewise possible with the aid of a supercapacitor installed there.

Further particularly advantageous embodiments and developments of the invention result from the dependent claims and also the following description. In this case, features of one claim category can be developed in accordance with the features of the other claim category, so that the effects and advantages listed in connection with the one claim category are also present for the other claim categories.

In order to use the signal optimally, according to a further aspect, the supply device can, with the aid of the signal, in addition to the energy supply of one or more shelf labels fastened to the shelf edge strip, set up communication with the one or more selected shelf labels, and when the signal is present, each shelf label checks, while analysing the signal, whether it is selected for communication with the supply device. In addition to an integrated energy supply of all of the shelf labels fastened to the shelf edge strip along the conductor loop, this enables selective addressing or selective communication set-up with an individual shelf label or a group of shelf labels, which are arranged along a conductor loop.

In this case, it is advantageous if each shelf label first establishes its electrical supply with the aid of the signal when the signal occurs, and subsequently the check takes place as to whether it is selected for communication with the supply device. Thus, it is ensured that the energy stored in the long-term energy storage device is used decidedly only during operation of the shelf label outside of the time period where the signal is present. At the same time, the energy provided with the aid of the signal is used for the direct supply of the shelf label for communication purposes.

In order to optimize the energy yield during storage of the energy transmitted with the aid of the signal, it is advantageous if each shelf label which determines that it is not selected for communication with the supply device, reduces its activities to using the signal during the entire remaining time period when the signal is present to store electrical energy until the long-term energy storage device is charged as completely as possible. For this purpose, the electronics of the shelf label can be designed in such a manner that parts of the electronics, in particular those e.g. digital components which are used for communication purposes and which are not required directly for storing energy during the entire remaining time period when the signal is present, are switched off, switched to be current-free or at least to a state with extremely low power consumption.

The electronics of the shelf labels can also be designed in such a manner that the procedure of energy storage when the signal is present is independent of whether the respective shelf label should take part in communication with the supply device or not.

Such an electronic shelf label can provide a wide variety of functionalities or fulfil a wide variety of functions with the aid of its electronics or assemblies. The shelf label can be configured or accordingly designed e.g. to detect environmental parameters such as e.g. for temperature or moisture detection, or as an input element for receiving an input interaction of a user (e.g. detecting a fingerprint or a key press) or else as a display medium for presenting information for the user, namely as a shelf label display. Also, sensors may be present, with the aid of which the distance to objects on the shelf or else in front of the shelving unit can be determined, such as e.g. what are known as "time-of-flight" sensors. Also, a camera may be contained, with the aid of which digital images of products or the EAN code thereof can be generated, which can subsequently be used for registering products or for producing a logical link between a product and the relevant shelf label. The camera can however also be used for detecting people or detecting the movement direction of the person or else the movement of their hands in front of the shelving unit. Also, an identification of people, such as for example identity checking and resultant approval of permissions for service personnel, can be realized. Building on that, the shelf label can e.g. display information or provide interaction options, which are only intended for service personnel or in particular for a particular category of service personnel (merchandiser, manager, etc.).

Accordingly, at least one shelf label of the system may comprise at least one electric consumer (sensor, camera, input element, etc.), which causes electrical power consumption outside of the time period where the signal is present, wherein according to the method, each shelf label, which comprises such a consumer, covers the power consumption of the consumer outside of the time period where the signal is present with the aid of the electrical energy stored in the long-term energy storage device.

The consumer(s) is/are therefore additional components which are provided in addition to the components of the shelf label, which are required for contactless energy and communication provision and, if appropriate, for displaying information in the case of a configuration of the shelf label as a shelf label display. However, a display unit required for that may also be configured as a consumer and therefore supplied with the aid of the long-term energy storage device.

Also, while the signal is present, electrical supply to the consumers can take place with the aid of the energy stored in the long-term energy storage device.

It is particularly advantageous if the respective consumer processes data during its activity causing the electrical power consumption outside of the time period when the signal is present, which data were previously transmitted, during communication of the supply device with the shelf label comprising the consumer, from the supply device to the said shelf label and saved there. This is the situation for example, if biometric data, which correspond e.g. to service personnel, were previously transmitted from the supply device to the shelf label and then at a later time, at which the signal is no longer present, are used to identify a person (e.g. the service personnel) with the aid of the camera. Also, at any desired time outside the time period where the signal is present, the image contents of a display unit of the shelf labels can thus be changed whilst using the image data received previously from the supply device.

Furthermore, it has proven advantageous that the respective consumer generates and stores data during its activity causing the electrical power consumption outside of the time period when the signal is present, and these data are transmitted subsequently, that is to say inside the time period where the signal is present, from the shelf label to the supply device during communication with the supply device. This is the scenario for example if, outside of the presence of the signal, with the aid of a consumer, such as for example a temperature sensor, temperature curves are recorded, or for example a time-of-flight sensor, the change or distance or addition of objects on the shelf is detected, or for example with the aid of an input element, user input is detected, etc. In all of these cases, the relevant consumer generates data, which are communicated at a later time when the signal is present to the supply device for further processing. For this purpose, the respective consumer comprises a storage unit, which it is possible to access, if the signal is present, via a databus from the electronics of the shelf label provided for communication with the supply device. It would also be possible to provide a central storage unit (e.g. EEPROM), in which the data are created centrally by the respective consumers and can also be retrieved centrally from there with the aid of the aforementioned electronics provided for communication.

In any case, the shelf label is furthermore designed such that it can be attached to the shelf edge strip in question. Thus, it comprises fastening elements which are constructed in an essentially complementary manner to those of the shelf edge strip, in order to create a non-positive connection to the shelf edge strip. The realization is preferably rail-like, so that the shelf label can be positioned as desired along the shelf edge strip and, if appropriate, can also optionally be displaced freely along the shelf edge strip. Positioned there, the shelf label is supplied with energy in the contactless manner described in detail in the following.

The shelf label can comprise a proprietary interface for energy transmission, which can be used solely for this purpose. However, the shelf label preferably comprises a standardized energy transmission interface, which can be designed for example according to the RFID standard (RFID stands for Radio Frequency Identification, and an applicable standard is e.g. ISO/IEC 18000 etc.). Particularly preferably, however, the shelf label comprises a first NFC interface for its contactless energy supply with the aid of a (wireless) signal (NFC signal). This is associated with the advantage that this NFC interface can be used not only for local energy transmission at the shelving unit or shelf edge strip, but also for bidirectional contactless communication directly there. In particular, problems in wireless traffic caused by other radio systems in a business or sales area are avoided thereby, because they are usually situated far away from the shelving units where the shelf label is installed and therefore have hardly any or no influence at all on the local energy transmission or communication between the communication partners positioned close to each other directly on the shelf edge strip. Here, NFC stands for Near Field Communication, and the applicable standards are e.g. ISO/IEC 13157, -16353, -22536, -28361, etc.

The shelf label, when configured as a shelf label display, can comprise an energy-saving display unit such as e.g. an LCD display. In particular, however, the technology that is used is based on electronic ink or electronic paper technology. A display unit of this type therefore comprises a reflective screen, also termed electronic paper display, abbreviated EPD, in technical jargon, and is realized with the aid of "electronic paper", abbreviated to "e-paper" or "e-ink". These terms substantially stand for the principle of an electrophoretic display which contains e.g. positively charged white particles and negatively charged black particles in a transparent, viscous polymer. By briefly applying a voltage at electrodes, between which the medium made up of particles and polymer is arranged, either the black particles are placed in front of the white particles or vice versa in the viewing direction. This arrangement is then maintained for a relatively long time (e.g. a few weeks) without further energy supply. If the display is segmented accordingly, e.g. letters, numbers or images can be realized with relatively high resolution in order to display said information. Such a reflective screen can however also be realized with the aid of other technologies, which are known e.g. under the term "electrowetting" or "MEMS". The screen can be designed e.g. as mentioned for black and white display, for greyscale display, for black, white and red display or else for black, white and yellow display. Future developments, which enable a full-colour or even multi-colour display, should also be included. Such a screen is very generally a reflective, that is to say passive, non-self-illuminating screen, in which the—relatively static—information display is based on light generated by an external (artificial or natural) light source (ambient light) shining onto the screen and being reflected from there to the observer.

The display unit is supplied with energy on the one hand and data on the other hand, which can represent commands for controlling the display unit or else image contents, with the aid of the first NFC interface. Therefore, during energy supply via the NFC interface, the said data can also be transmitted via this NFC interface, said data being processed by the display unit to the effect that the image content of its screen changes. After the image content has finished changing, corresponding status information representing the successful change of the image content can also be output by the display unit via the NFC interface. After the image content has finished changing, where applicable also after the status information has been output, the energy supply by means of the signal can be terminated via the first NFC interface, after which the image content of the screen remains unchanged until the next desired change.

The first NFC interface also comprises the aforementioned electronics, actually a microcontroller unit in the present case, which can exchange data with the consumers via the databus.

Also, e.g. a central microcontroller unit can be provided in the shelf label in addition to the NFC interface and its digital stage, which microcontroller unit coordinates (controls) the processes and functionalities in the shelf label, but in particular also controls the energy management in the shelf label.

Above all, the use of said technologies in particular allows the shelf label to be realized in particular as a shelf label display without its own battery or a rechargeable battery, which are both relatively expensive and need maintaining or replacing in the course of time.

If appropriate, a first capacitor, namely what is known as a smoothing capacitor, which is usually provided in voltage supply devices (here in actuality what is known as a contactless power transmission unit), is used in the shelf label for short-term, temporary smoothing or stabilization of the internal supply voltage.

Also, the shelf label may comprise one or more second capacitors, namely what are known as backup capacitors, which are usually provided in a distributed manner in the electronics, in order to support the supply voltage locally in the surroundings thereof.

The shelf label is therefore designed such that its electronics for communication, if appropriate also for updating the screen content, while using the first NFC interface are only ever active when it is supplied with the aid of the external electronic supply device by means of the signal.

In the event of the discontinuation of the signal, the smoothing capacitor and the backup capacitors only allow an extremely short, temporary additional operation of the first NFC interface until the failure of the supply voltage established by the NFC interface itself. From this time, only the electrical energy stored in the long-term energy storage device is still available for the consumers of the shelf label, using which energy, operation over several hours can be maintained, until the long-term energy storage device must be recharged with the aid of the signal (e.g. NFC signal).

The housing of the shelf label can be completely and permanently encapsulated, because it is no longer necessary to replace a battery or a rechargeable battery, and therefore it can only be opened for recycling purposes (e.g. with a special tool).

The NFC functionality, such as e.g. standardized NFC communication with standardized energy supply during the NFC communication can be realized with the aid of a commercially available NFC module (e.g. for realizing an NFC tag). Together with the aforementioned display capability, a shelf label which is reduced to a few, absolutely necessary electronic components and is therefore also extremely inexpensive with regards to these two functionalities can thus be realized.

Updates of the screen of the energy-saving display unit and the status report about that are not dealt with directly by the shelf label display in a communication with an access point, as is the case in known systems, but rather are handled by the interposed supply device, which acts as a relay station and for its part is in contact with the access point via a suitable (and essentially freely selectable) communication method, which is additionally discussed in detail in the following.

If functions beyond the pure display capability are required, the shelf label is equipped with the consumers required therefor ex works e.g. in a modular manner. The supply device then acts not only as a relay station for the communication with these consumers when the signal is present, but rather also as a relay station for supplying energy to the shelf labels positioned in a manner corresponding to their conductor loop, in order to enable delayed operation of the consumers of the shelf labels, if appropriate also the display unit for example for changing image content, outside of the time window when the signal (e.g. NFC signal) occurs.

As mentioned, the supply device comprises at least one conductor loop formed on the shelf edge strip and an electronic supply unit which is coupled to the at least one conductor loop, in particular electrically conductively connected to the two line ends thereof, referred to below as loop connectors. The supply unit is designed to transmit the energy for the electrical supply of a shelf label, which is mounted on the shelf edge strip corresponding to the conductor loop, contactlessly to the shelf label with the aid of the conductor loop. "Contactless" here means that this takes place by means of the generation and emission of the aforementioned signal (e.g. NFC signal), that is to say by sending the signal or with the aid of an inductive coupling between two adjacently located conductor loops or coils.

To receive the signal, the shelf label also comprises a conductor loop consisting of a single loop or winding or a multiplicity of windings, that is to say a coil. This coil is a constituent of the first NFC interface of the shelf label.

Furthermore, "corresponding to" means that the shelf label is positioned adjacent to the area spanned by the conductor loop of the shelf edge strip and is located there essentially inside or adjacent to a zone delimited by the conductor loop of the shelf edge strip. The conductor loop of the shelf edge strip itself may be designed to be e.g. visible in the plane of the shelf edge strip or covered by a protective material strip or a wall of the shelf edge strip. If the shelf label is inserted into the shelf edge strip, then the conductor loop or coil installed into the shelf label is automatically located in the zone that can be used for the transmission of the signal between the two adjacently positioned conductor loops or coils. Preferably, in the shelf label inserted into the shelf edge strip, the areas spanned by the two conductor loops or coils (on one side belonging to the shelf edge strip and on the other side belonging to the shelf label) are orientated parallel to one another and located at a defined spacing of less than one millimetre up to a few millimetres.

In order to ensure, that is to say not to impair or hinder, the signal transmission to the shelf label and the communication between the supply device and the shelf label, the shelf edge strip itself is manufactured from a suitable material, preferably from plastic, e.g. by means of injection moulding. On its rear side, that is to say the side facing the shelving unit and thus facing away from the shelf labels fastened to it, the shelf edge strip may comprise an electrically conductive, preferably metallic, particularly preferably extensively formed, shielding, which allows it to generate a defined background, which allows the tuning of an antenna LC circuit in the supply device, which is required for the signal transmission, to this defined background. An undefined background can namely lead to the antenna LC circuit being so severely off-tune that communication may even become impossible and/or the energy transmission is inefficient. The defined background generated by the shielding contributes to the efficient energy transmission and also reliable communication.

Furthermore, the at least one conductor loop can optionally be integrated into the shelf edge strip or fastened on the same. The integration into the shelf edge strip is advantageous if the shelf edge strip is for example manufactured from plastic as mentioned, and the conductor loop is integrated there as soon as during e.g. injection moulding, that is to say during the manufacture of the shelf edge strip. The conductor loop can however also be fastened on the surface of the shelf edge strip, e.g. by means of adhesive bonding. In particular if many conductor loops, which are arranged next to one another, are required and accordingly also many supply lines are to be considered, it has proven advantageous if the conductor loop(s) is (are) formed on a printed circuit board. This printed circuit board can then be integrated as a separate component into the shelf edge strip or fastened on the same. Also, the shelf edge strip can be constructed in such a manner that the printed circuit board can be replaced, so that it is possible to easily react to a wide range of different requirement profiles in shelf planning with very different conductor loop configurations, which can be realized e.g. on a single printed circuit board or on different printed circuit boards. Particularly preferably however, the shelf edge strip itself comprises a conductor loop mount. This may be constructed in such a manner that it is located e.g. on the front side of the shelf edge strip, that is to say where the rear side of the shelf label is as close as possible to the shelf edge strip in the state where the shelf label is fastened on the shelf edge strip. The conductor loop mount can however also run on the rear side of the shelf edge strip, corresponding to the region of the shelf edge strip where the shelf label can be attached, which may entail a better accessibility of the conductor loop for maintenance purposes or else ensures an unparalleled protection from damage. Finally, there, the conductor loop is also hidden from the view of the customers of a supermarket. Structurally, the conductor loop mount can be realized e.g. by a gap-like depression in the e.g. plastic material of the shelf edge strip, into which depression the conductor loop is inserted. Thus, the shape of the conductor loop as well as the exact position thereof can also be defined as precisely as possible without further measures (such as e.g. the previously mentioned printed circuit board and the positioning thereof). Also, the conductor loop positioned on the rear side can be electrically conductively connected at practically any desired point to electronics of the supply device, without consideration having to be given to the position of the shelf labels positioned on the front side of the shelf edge strip. The depression may also comprise a snap or fixing mechanism, which fixes the conductor loop in its intended position. Also the depression may be constructed in such a manner that it can accommodate a plurality of windings of the conductor loop, wherein these can be arranged next to one another and/or above one another in the depression.

Also, one is not bound by the limits of the production process for printed circuit boards during the integration of a conductor loop mount directly into the shelf edge strip (that is into the material thereof) during the planning or production of the conductor loop and can therefore also realize conductor loops with a length which far exceeds those for current printed circuit boards of approx. one metre. It is therefore absolutely possible to realize a conductor loop which extends along an entire shelf edge strip, which may be several metres long.

The perimeter of the conductor loop may for example extend along the entire length of the shelf edge strip and the entire height of the shelf edge strip. Preferably, the area spanned by the conductor loop will however be somewhat smaller than the area of its front side defined by the physical dimensions of the shelf edge strip. The at least one conductor loop is preferably located inside the channel of the shelf edge strip, which is formed on the rear side of the wall of the shelf edge strip, against which the shelf label inserted into the shelf edge strip bears by way of its rear side or rear wall. The said channel is integrated in this wall. To realize the conductor loop of the shelf edge strip, a single conductor track running round or a conductor track running around multiple times in a coil-like manner, that is, comprising multiple windings, can be provided. This conductor loop comprises a loop connector at each of its two ends, to which the supply device is connected.

The shelf edge strip may be equipped with a single conductor loop, which extends e.g. essentially along the entire length of the shelf edge strip. Thus, a plurality of shelf labels can be supplied simultaneously with a single signal. However, it may also be advantageous, if a plurality of conductor loops is formed along the longitudinal extent of the shelf edge strip, each of which conductor loops is coupled by itself to the supply unit (as mentioned, only in this case with individual loop connectors), and the supply unit is designed for loop-selective emission of the signal, that is to say for selective energy transmission with the aid of each of the conductor loops. This makes it possible optionally to supply a single shelf label or a group of shelf labels with energy using a single supply device, wherein the shelf labels are arranged in a manner corresponding to the respective conductor loop of the shelf edge strip. Depending on the implementation, for example, 2 or 3 or up to 15 or even considerably more conductor loops can be realized along the shelf edge strip. These conductor loops are positioned next to one another along the longitudinal extent of the shelf edge strip and their in each case two loop connectors are guided along the shelf edge strip to the supply device and there electrically conductively connected to the same. The longitudinal extent of the zone covered by the respective conductor loop at the shelf edge strip may be identical for all conductor loops. Thus, along the shelf edge strip, many zones may be defined located close together, the respective longitudinal extent of which is orientated to the longitudinal extent of the shelf label that is used on the shelf edge strip, wherein the longitudinal extent is usually a few cm, such as e.g. 8-12 cm. This allows the individual (selective) energy supply for each shelf label as well as the individual (selective) communication with each individual shelf label at (almost) any desired positions along the shelf edge strip. This is advantageous if the positioning of the shelf label should take place as flexibly as possible and in spite of that an energy supply or communication, which is as individual as possible, should be possible with each shelf label. However, larger zones may also be provided, in which a plurality of shelf labels may be located, which are then supplied with energy collectively using the relevant conductor loop and either are provided with data collectively or carry out individual communication with the relevant supply device, as long as the signal is present. This configuration can be used if the exact position of the respective shelf label does not come into consideration. Such a case results, if e.g. a plurality of identical products are placed on a shelving unit over a relatively long section or the entire length of the shelving unit and the same information for these products is always presented by a plurality of shelf label displays placed at relatively large distances from one another along the longitudinal extent of the shelf edge strip. However, mixed configurations of relatively short zones and, relative thereto, also relatively long zones may also be present along a shelf edge strip.

The conductor loops of the shelf edge strip may all be used together, that is to say simultaneously, for energy transmission by the supply device. However, this means a corresponding design or a corresponding construction for the electronics of the supply device. Therefore, it has proven particularly advantageous if the supply unit is designed for multiplexing the energy transmission via the conductor loops. In this case, it is always only one single conductor loop, which is selected electronically, that is used for energy transmission.

As already explained analogously in connection with the shelf label, the supply unit can be designed differently in terms of its interface suitable for energy transmission. However, the supply unit is preferably designed as a second NFC interface for the contactless energy supply of the shelf label(s), wherein the at least one conductor loop of the shelf edge strip is a constituent of the NFC interface that is intended for contactless energy transmission (as well as for contactless communication). The second NFC interface can be realized using a commercially available NFC circuit (e.g. NFC reader circuit), which is connected to the conductor loop.

Quite generally, it is to be determined here, that the conductor loop therefore realizes an inductor, which is used as a constituent of an antenna or else for inductive coupling with the corresponding inductor or conductor loop on the side of the shelf label.

It has proven particularly advantageous if exactly one single electronic supply device is used per shelf edge strip. This makes it possible to realize a focused energy supply only for this one shelf edge strip, that is to say the entirety of the shelf labels fastened to it.

In this context, it has furthermore proven particularly advantageous if the electronic supply device is integrated into the shelf edge strip or is fastened on the same. Thus, a shelf edge strip with individual electronic energy supply can be realized. In this case, the supply device can e.g. also be constructed directly on the printed circuit board. Furthermore, the supply device can be connected to the same as a module or mechanically coupled to the shelf edge strip as a module, e.g. laterally inserted into a mounting space or region provided therefor and, positioned there, electrically conductively connected to the conductor loop of the shelf edge strip. As a result, the shelf edge strip as a whole, including its supply device, can be taken out and recommissioned at a different location without problem.

The energy supply to the supply device can be realized in different ways. Thus, the supply device can for example be realized via an Ethernet cable connecting the supply device to other communication devices (e.g. a router), wherein the supply voltage for the supply device is also provided via this Ethernet cable.

However, a separate supply station (e.g. a power supply unit) can also be provided for the energy supply to the electronic supply devices. This supply station preferably supplies a group of electronic supply devices, particularly preferably for an entire shelving unit, in particular for a group of shelving units. This allows a supply infrastructure to be constructed in a modular manner for a single shelving unit or for geographically or thematically sorted groups of shelving units, or else the number of supply stations to be reduced to a necessary minimum.

Particularly preferably, however, the electronic supply device is designed such that it can be supplied with energy wirelessly, and the supply station for its part is designed as a wireless energy source for in particular directional wireless energy supply of the electronic supply device. With the aid of the wireless energy source, therefore, a contactless, targeted energy transmission to the supply device takes place. To receive the energy-transmitting wireless signal, the supply device comprises a supply receiver. This allows a completely cable-free supply infrastructure of the shelf labels fastened to the shelf edge strip on the one hand and also the supply device provided for supplying the shelf labels on the other hand. In fact, the fitter of the system is spared the cabling between the actual energy source and the respective shelving unit. These circumstances allow the shelving units to be positioned substantially as desired within the business and the shelf edge strips to be positioned as desired and simply on a wide variety of shelving units and also to be exchanged between the shelving units. This type of energy transmission and the technology on which it is based is referred to using the term "power over WiFi". Wireless energy sources equipped with this technology can be installed for example on the ceiling of business premises and selectively supply, within a range of up to a maximum of 10 metres, the supply devices assigned to the respective shelf edge strips and located within said range with the aid of powerful, that is, focused wireless signals directed towards said supply devices.

Preferably, as discussed previously, the electronic supply device can also be designed for contactless communication with one or more shelf labels using the technology which is also used for energy transmission to the shelf label. The aforementioned NFC technology is preferably used again for this. This allows as optimal a use as possible of the available electronic components for both the contactless energy transmission and the contactless communication over relatively short distances, as is the case for shelf labels fastened to the shelf edge strip.

The supply device can be designed in such a manner that it also generates and emits the signal when the energy supply the wireless energy source is present, in order also to supply energy to the shelf labels positioned in a manner corresponding to their conductor loop of the shelf edge strip in a contactless manner precisely within the time period of energy supply by the wireless energy source. However, in order to enable an energy supply of the shelf labels also outside of the time period within which the energy supply by means of the wireless energy source is present, it is advantageous if the supply device comprises a supply energy storage device. This may be a rechargeable battery or else an aforementioned supercapacitor. This supply energy storage device is coupled with charging electronics of the supply device, wherein the charging electronics may be a constituent of the supply receiver or may be designed separately therefrom to be connected to the supply receiver. The charging electronics, which may be realized e.g. as commercially available module, are designed in such a manner that the charging of the supply energy storage device takes place using the same during receipt of the wireless signal from the wireless energy source, and if appropriate, the supply voltage that is then available is output.

With the aid of the supply energy storage device of the supply device, on the one hand the operation of the electronics of the supply device itself and on the other hand also the energy supply of the shelf labels on the shelf edge strip, on which the supply device is installed, can be realized separately (that is to say with a time delay) from the temporal occurrence of the wireless activity of the wireless energy source. Thus, e.g. an operating scenario can be realized, in which for example during the hours of night, the supply energy storage device of the various supply devices can be charged with the aid of the wireless energy source, in order to supply the shelf labels with energy with the aid of the signal whenever required during the day. Also, if there is a corresponding requirement during the day, supply devices can be provided with energy in a targeted manner in order on the one hand to recharge its own supply energy storage device and/or also to supply shelf labels with energy from the respective supply device with the aid of the signal. This may be of interest, if due to increased activity in one or more shelf labels, the autonomous energy supply of the supply device is not ensured during the day until the next night-time charging.

In addition to the second NFC interface, which is provided for supplying energy to the shelf labels and communication with the shelf labels, the supply device comprises a further interface, which is intended for communication with an access point. This further interface can be designed for wireless communication. A time slot communication method, in particular a proprietary time slot communication method, can be used for the wireless communication with the access point.

According to this proprietary time slot communication method, a communication station (here the access point) communicates with a number of supply devices with the aid of a time slot communication method, in which a number of time slots per time slot cycle in a constantly repeating sequence are available for communication, and each time slot is identified uniquely by a unique time slot symbol and thus can be distinguished from other time slots solely by the time slot symbol. According to the method, the access point sends, for the currently present time slot, a synchronization data signal comprising the time slot symbol at the start of the respective time slot. The supply devices are designed to change, at a wake-up time, from a sleep state into an active state and to receive the synchronization data signal in the active state, and, when the received time slot symbol indicates a time slot defined for the respective supply device, to define a new wake-up time, which corresponds to the next occurrence of the time slot defined for this supply device, in a time slot cycle following the currently present time slot cycle.

This has the advantage that a synchronism between the access point and a supply device is detected, maintained and ensured during operation of the system in the most simple and yet extremely robust manner. This also improves the energy efficiency of all the supply devices which are logically assigned to a single access point, because the check for synchronism takes place immediately at the start of the time slot.

It is in this case completely sufficient for each supply device involved in communication with the relevant access point to know the time slot symbol which indicates the time slot defined for it. Each of the supply devices therefore orients itself individually by the occurrence of a time slot symbol relevant for it, identifies the time slot symbol relevant for it, and defines its next wake-up time in order to remain synchronous with the timing of the time slot communication method predefined by the communication station, this timing being known to the supply devices. In this case it is completely sufficient for the time slot symbol to identify the respective time slot uniquely, e.g. with a time slot identifier that is individual for each time slot. Further information encoded into the synchronization data signal, as often occurs in other methods, is not necessary here to operate a supply device synchronously with the access point to which it is wirelessly assigned. The relevant supply device therefore establishes its synchronism with the access point solely by the fact of detecting the time slot symbol, which occurs at the time expected by it or within an expected time window and indicates the time slot defined for it.

After the supply device has established its synchronism as explained above, it is in principle sufficient for it to change back into the sleep state, because the next wake-up time is automatically known by means of the time slot pattern, known to it, of the time slot communication method. The definition of the new wake-up time can thus be limited to, e.g. a time control stage (e.g. a timer) of the supply device being restarted with the timing parameters already used previously to change from the sleep state to the active state. The supply device can then change back into the sleep state and stay there until, triggered by the time controller, a wake-up and a change from the sleep state to the active state is carried out again at the new wake-up time in the next time slot cycle. However, the supply device does not necessarily have to stay in the sleep state for the rest of the time slot defined for it, but can also process further tasks in an active state during the time slot or also during the time slot cycle. The previously explained time controller then operates in the background independently of the other, further activities of the supply device. The new wake-up time can be defined by defining an absolute or relative time specification, for example relatively to the time of occurrence of the synchronization data signal or relatively to the time at which the sleep state is assumed again after the active state, or else relatively to the time at which the end of the synchronization data signal occurs. However, the definition of the new wake-up time can also be understood such that the duration of the sleep state following the active state in which the time slot symbol was received or else the sum of the durations of the sleep state and of the active state or else the sum of the durations of multiple such state sequences defines the new wake-up time.

Since each supply device operates its own time control stage and exemplary scattering of the behaviour of the respective electronic components cannot be ruled out, the definition of the new wake-up time can also include compensation for a drift of its time basis present individually for each supply device. To this end, a time difference between the expected occurrence of the synchronization data signal with the time slot symbol, which indicates the time slot defined for the respective supply device, and the actual occurrence can for example be measured in the supply device and taken into account in the time control stage to correct its timing. However, the compensation is only used when synchronism is established.

If, however, a different time slot symbol instead of the expected time slot symbol was received, there is no synchronism and the supply device must carry out a re-synchronization. To this end, such an asynchronous supply device does not change periodically, as would be the case in the synchronous state, but rather changes from its sleep state into its active state e.g. a single time at any desired time and remains in this active state in the ready-to-receive state. If nothing was received within a certain time period, for example a time slot duration, it changes back into the sleep state and repeats the receive attempt at another time. As soon as a synchronization data signal is received, the time slot symbol is evaluated, that is to say, checked. The time slot symbol received indicates with the highest probability a time slot which is not defined for the relevant supply device, which is established autonomously by the supply device. The supply device knows the system of the occurrence of the time slot symbols and can automatically decide, after evaluating the received time slot symbol, whether it can expect the time slot defined for it in the present time slot cycle (first case) or not until the following time slot cycle (second case). For the first case, the supply device is designed to define a new wake-up time corresponding to the next occurrence of the time slot defined for it, in the currently present time slot cycle. By evaluating the received time slot symbol and knowing the system of the occurrence of the time slot symbols, the supply device establishes that the time slot defined for it will still occur in the currently present time slot cycle. For the second case, the supply device is designed to define a new wake-up time corresponding to the next occurrence of the time slot defined for it, in the time slot cycle following the currently present time slot cycle. By evaluating the received time slot symbol and knowing the system of the occurrence of the time slot symbols, the supply device establishes that the time slot defined for it will no longer occur in the currently present time slot cycle because it has already occurred in the past within this time slot cycle. As explained above with regard to the synchronous state, the said time controller is also used for this type of definition of the new wake-up time, wherein the time controller is operated with the timing parameter with which the desired entry into the synchronous state is achieved. The timing parameter to be selected results for the supply device from the inherent knowledge of the time slot communication method used. The timing parameter is therefore defined by the electronics of the supply device, which has knowledge of the parameters of the time slot communication method.

These parameters can be requested from the access point by the supply device or transmitted to it when the supply device is registered at the respective access point, or can already be programmed into the supply device beforehand. In both cases, it is expedient if the supply device comprises a storage stage for storing the parameters of the time slot communication method, and the supply device is designed to access and take into account these parameters for the purpose of defining the new wake-up time. The parameters can represent all the details of the timing of the time slot communication method, such as parameters relating to time sequences for communicating between the access point and the supply device, parameters relating to predefined times or time segments, but also parameters relating to the basic structure of the time slot communication method, such as e.g. the number of time slots, the duration of a time slot, the duration of the time slot cycle, or else as parameters, the explicitly specified time slot symbols for identifying the individual time slots or else algorithms for calculating the time slot symbols. With the aid of these parameters, an asynchronous supply device can detect autonomously, that is to say, automatically for itself without external assistance, whether, on the basis of the time slot symbol just received, the time slot defined for it can still be expected within the currently present time slot cycle or whether the time slot defined for it already belongs to the past in the present time slot cycle and therefore the next time slot defined for it will not occur until the next time slot cycle. The supply device in question calculates the new wake-up time in the active state, changes to the sleep state, and changes to the active state at the calculated wake-up time, receives the time slot symbol of the time slot defined for it and is then back in the synchronous state. If no further activities are expected of it in the present time slot, it changes immediately to the sleep state and then does not change back to the active state until the next time slot cycle, in order to receive the synchronization data signal in the time slot defined for it.

For communication with the access point, such a supply device essentially comprises a wireless communication stage, also termed a transceiver, and a logic stage, which interacts therewith and provides the logic function of the supply device. The transceiver is an electronic system which is designed both to receive and transmit and in which the required functionality for modulating a carrier signal and demodulating receive signals is provided. The transceiver can be realized by means of active and passive electronic components or assemblies, with the aid of which analogue signals can be converted into digital signals and vice versa.

The logic stage can be realized for example completely by means of hardware or comprise a microprocessor and memory modules or a microcontroller with integrated memory modules so that software stored in the memory modules can be executed. The supply device can receive a wireless signal from the access point with the aid of its transceiver, process receive data contained in the wireless signal with the aid of the logic stage, and where necessary generate response data with the aid of the logic stage and output said response data again via the transceiver to the access point as a wireless signal.

As explained previously, such a supply device comprises the supply energy storage device for its own energy supply and for supplying energy to the shelf labels. In order to operate as energy efficiently as possible, the supply device comprises various operating states. These include the active state with a relatively high energy consumption. The active state is present e.g. when transmitting or receiving data during communication with the access point or when supplying energy to the shelf labels with the aid of the signal and subsequently also when transmitting and/or receiving data during communication with the shelf labels or also during battery voltage measurements of the voltage that can be generated with the aid of the supply energy storage device. By contrast, in the sleep state, there is a relatively low energy consumption in the sleep state. Preferably, as many electronic components as possible are disconnected from the electricity supply by the supply energy storage device or switched-off or at least operated in a mode with lowest possible energy requirement (e.g. with a slowest possible clock speed). The active state is predominantly present for detecting the synchronism with the access point and in the time slot defined for the supply device for communication with the access point. In the active state, the supply device is e.g. in the ready-to-receive state, in order to receive commands and, if appropriate, also receive data from the access point and process the same with the aid of its logic stage. In the active state, send data can also be generated with the aid of the logic stage and communicated to the communication station. Outside of the time slot defined for the supply device, the supply device is predominantly operated in the energy-saving sleep state. In the sleep state, the logic stage or the time control stage only carries out those activities which are required for the timing for prompt wake-up, so that the supply device is ready for the next time slot defined for it for receiving the synchronization data signal and/or for communication with the access point.

By way of example, it is also mentioned here that in the proprietary time slot communication method, m time slots, e.g. 255 time slots, are used, e.g. within n seconds, e.g. 15 seconds. The n seconds form a time-slot cycle. In this time slot communication method, m time slots are therefore available within a time-slot cycle for communication with the supply devices. Each of the supply devices is assigned to one of the time slots, wherein a plurality of supply devices can also be assigned to a defined time slot.

In order to operate as energy efficiently as possible, that is to say to minimize the internal energy consumption of each supply device, the fundamental operating strategy for each supply device therefore consists in keeping the synchronous supply device in the sleep state for as long as possible and only to operate in the active state for a shortest possible time period when absolutely necessary, such as e.g. on the one hand for the purpose of data transmission with the access point and on the other hand for the purpose of emitting the signal to the shelf labels, in order to transmit energy there and, if appropriate, also to communicate with them. This together with the previously explained energy storage, which is as complete as possible, at the shelf labels, that is to say as soon as the signal is present, so that as little energy as possible is lost due to unused radiation of the signal, leads to a comprehensive energy efficiency of the system, particularly its contactless components (supply devices and shelf labels).

In principle, however, a communication protocol based on the standards or specifications ZigBee, Bluetooth or WiFi, etc. can also be used for the wireless communication with the access point, which leads to a less energy efficient operation of the system, however.

The supply devices therefore realize a contactless "gateway" or a relay station for the entirety of the shelf labels mounted on the respective shelf edge strip both for energy transmission and for transmitting communications between the shelf labels and the respective access point, to which the supply device is wirelessly assigned.

The access point is used as a higher-level interface between the shelf labels of an IT infrastructure controlling the shelf labels, such as a server with corresponding software application, a cloud solution and the like, for example. In such a wireless system, a group of shelf labels is assigned wirelessly (logically) by the respective supply device to such an access point so that communication with this group of shelf labels only takes place via this access point. In a business premises, for example of a supermarket, a plurality of such access points can be installed, each access point being provided for communication with supply devices logically (wirelessly) assigned to it. Beyond the supply devices, which are located in a geographical (wirelessly) reachable) area around it, the access point can communicate with the shelf labels grouped on the shelf edge strip of the respective supply device.

In addition to this functionality, the access point can also comprise the supply station, which is designed for the directed, wireless energy supply of the electronic supply device.

In summary, the supply device implements, for the shelf edge strip in question, a combined energy supply and communication supply device for the shelf labels fastened to the relevant shelf edge strip. The supply device is thus configured or designed for local contactless energy transmission and local contactless communication with shelf labels fastened to the shelf edge strip. Such a supply device can also be referred to as a shelf edge strip control device or else shelf edge strip controller, because it controls all the activities of the shelf labels mounted on the relevant shelf edge strip, which, depending on the configuration of the shelf labels, includes both the display behaviour, the communication behaviour and the respective energy supply and the operation of the further consumers of the shelf labels.

It has also proven particularly advantageous when the electronic supply device is designed for receiving and forwarding a unique identifier of the shelf label involved in the communication, for the purpose of determining the position of the relevant shelf label.

If a plurality of shelf labels are arranged within a conductor loop of the shelf edge strip or if a plurality of shelf labels are supplied with energy via a single conductor loop at the same time, precautions must be taken to ensure that the respective identifier is received. To this end, the shelf labels can for example be programmed such that they output their identifier (once or multiple times) at randomly selected times within a time window in order to ensure individual receipt at the supply device. An anti-collision method known for example from RFID technology can likewise be used during this contactless transmission in order to ensure individual receipt at the supply device.

The unique identifier is preferably forwarded to a data processing device, such as the server on the business premises for example, which carries out or coordinates the communication with the individual electronic shelf labels.

The server can also store the logical link between products placed on the respective shelving unit and the shelf label displays positioned there and thus ensure that the respective shelf label display presents the information belonging to the relevant product.

The server is also informed of the position or extent of the respective conductor loop on the shelf edge strip and is also informed, by the supply device together with the identifier, of which conductor loop was used to acquire the identifier from the shelf label. Three-dimensional digital maps of the positions of all the shelf labels in a business premises can thus also be created. This relates both to the shelf labels configured to display information and analogously to the other aforementioned functionalities of the shelf label that are possible due to the various consumers.

The electronics of the various devices of the system, just like also the interface etc. thereof can be realized with the aid of a very wide range of passive and also active electronic components in a discrete and also integrated manner. Preferably, a microprocessor with corresponding peripheral components or a microcontroller, upon which a software for providing the various functionalities is executed, is used in this case. Also, what are known as ASICs (Application-Specific Integrated Circuits) can be used. In detail, the various assemblies or functional groups, particularly the consumers in the shelf label, can in addition to passive components comprise the aforementioned individual integrated circuits (microcontroller, microprocessor, ASIC, etc.).

These and further aspects of the invention result from the figures discussed below.

BRIEF DESCRIPTION OF THE FIGURES

The invention is explained once more in detail in the following with reference to the attached figures on the basis of exemplary embodiments, to which the invention is not restricted, however. In the various figures, identical components are provided with identical reference numbers. In the figures.

DESCRIPTION OF THE EXEMPLARY EMBODIMENTS

Figure 1:
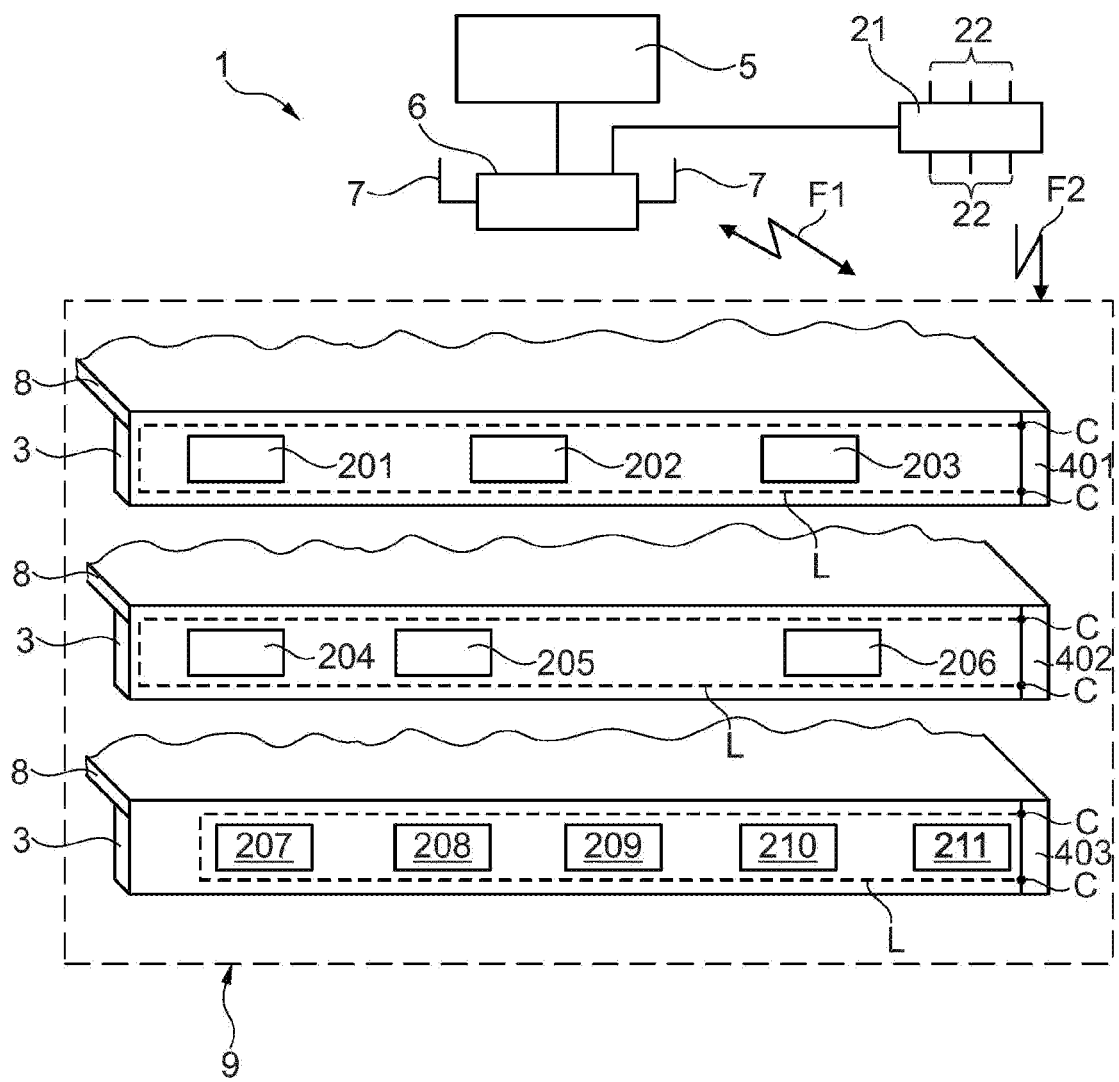
FIG. 1 schematically shows an electronic shelf label system according to the invention.

FIG. 1 illustrates a shelf label system 1, which comprises a number of electronic shelf labels 201-211, which are fastened to three—"intelligent"—shelf edge strips 3. Each shelf edge strip 3 comprises an electronic supply device 401-403, which is laterally inserted into it. Also illustrated is a data processing device, which is realized with the aid of a server 5, which is connected in a wired manner to an access point 6, which comprises two antennas 7, for example.

The supply devices 401-403 illustrated are in wireless contact with the access point 6 via first wireless signals F1. Thus, e.g. image contents of shelf labels 201-211 constructed as shelf label displays can be changed from the server 5, if appropriate also request associated status information from the shelf labels 201-211 and transmit the same to the server 5 or else control or use activities of additional consumers (which are additionally explained in the following on the basis of FIG. 3) of the shelf labels 201-211. The extremely energy-saving proprietary time slot communication method, which is explained in the general description, is used for this communication.

Each of the shelf edge strips 3 is mounted on the front edge of an individual shelf 8. The three shelves 8 illustrated all belong to a shelving unit 9 indicated only very schematically. Different products can be placed on the shelf 8, but in the present case are not illustrated for reasons of clarity.

The supply devices 401-403 are each illustrated schematically on the right-hand edge of the shelf edge strips 3, but this does not necessarily have to be the case. They can therefore also be situated in other positions along the shelf edge strip 3 or else on the left edge thereof. In the present case, the supply devices 401-403 are integrated into the shelf edge strips 3, that is to say, installed or inserted into a shaft (not illustrated here, but see FIG. 5), for example.

Furthermore, FIG. 1 shows in each case a single conductor loop L which is integrated into the shelf edge strip 3 and is connected by way of its two loop connectors C to the supply device 401-403 installed there. The shelf edge strips 3 carry the shelf labels 201-211.

The shelf edge strip 3 is, just like the shelf labels 201-211, designed in such a manner that the shelf labels 201-211 can be inserted into the shelf edge strip 3 from the front and in the process lock with the same by means of a snap mechanism in such a manner that they can only be removed from the shelf edge strip 3 again with the application of considerable force. At the same time, the mechanism mentioned allows the shelf labels 201-211 to be displaced along the shelf edge strip 3 with only comparatively little force outlay and consequently placed easily at any desired position. A snap mechanism of the described type is known, for example, from WO2017/153481A1, FIG. 2. The mechanism may however also be designed differently, which is also covered in detail in the following.

A block diagram of the shelf labels 201-211 is explained below on the basis of FIG. 2. Since it is assumed in the present case that all shelf labels 201-211 are constructed identically, reference is only made to a single shelf label 201 in the following.

The block diagram shows a first NFC interface 11 with its coil 12A, which is connected to an interface circuit 11A. The coil 12A together with an interface capacitor 12B forms an antenna LC circuit 12C, with the aid of which a signal of an NFC-enabled device can be received. In the present case, one is concerned with supply devices 401-403, which are designed to be NFC-enabled. If the coil 12A is brought correspondingly close (a few tenths of a millimetre up to approx. 4 millimetres) to the conductor loop L, which is the case for the shelf labels 201 attached to the shelf edge strip 3, the signal sent with the aid of the conductor loop L can be received with the aid of the antenna LC circuit 12C and used in the shelf label 201 for energy supply and for bidirectional communication with the relevant supply device 401-403.

For this purpose, the shelf label 201 comprises what is known as a contactless power transmission unit 11B connected to the antenna LC circuit 12C, which comprises a rectifier unit 11C at the input side and a voltage regulator unit 11D at the output side. Thus, a first supply voltage VCC1 is generated relative to a first reference potential GND1 when the signal is present, which first supply voltage has e.g. a value of approx. 2.2 volts and is provided for operating the NFC functionality of the shelf label 201.

The first NFC interface 11 furthermore comprises a communication unit 11E, with the aid of which the communication according to the NFC specification or protocol can be carried out. It comprises a load modulation unit 11F connected to the antenna LC circuit 12C for load modulation of the received signal as a function of send data signals TX. A further constituent is a protection unit 11G, which is likewise connected to the antenna LC circuit 12C and protects against an undesirably high input power and is designed as a signal limiter. Furthermore, a clock generator unit 11H, which is connected to the antenna LC circuit 12C, is provided, which generates a system clock CLK on the basis of the received signal, which system clock is used inside the communication unit 11E. An ASK demodulation unit 11I (ASK stands for "amplitude shift keying" here) forms a further component, which generates receive data signals RX from small fluctuations of the amplitude of the signal rectified with the aid of the rectifier unit 11C. Furthermore, a digital control unit 11J is provided, which is clocked with the aid of the system clock CLK and processes incoming receive data signals RX and converts the same into data D and generates outgoing send data signals TX from data D.

The block diagram also shows a display unit 13A, which is divided into an electronic paper display controller 14 and an electronic paper display screen 15 which can be controlled therewith. With the aid of the controller 14, the data received are interpreted, the image content of the screen 15 is changed accordingly, where necessary, or else status information in the form of data D is output to the respective supply device 401-403 via the first NFC interface 11.

In the present case, the shelf label 201 comprises further consumers in addition to the display unit 13A, namely an input unit 13B, a time-of-flight sensor unit 13C, a temperature sensor unit 13D and a camera unit 13E. Analogously to the display unit 13A, each of these units can comprise its own integrated controller circuit (IC).

A central microcontroller unit 13 forms a further consumer, which centrally controls the data traffic of the data D and the functionalities of the shelf label 201. The data processing or control takes place in this case according to program code, which is stored in the microcontroller unit 13 and is executed using the central processing unit (CPU) thereof.

All of these consumers 13, 13A-13E are defined or can be defined to be operated temporally separately from the existence of the signal, with the aid of which, as explained, the first supply voltage VCC1 is generated.

For this purpose, the shelf label 201 comprises a long-term energy storage unit 13F, which is divided into a long-term energy storage device in the form of a supercapacitor 13H and a charging stage 13G, which is designed for charging the supercapacitor 13H, wherein, when the signal is present, electrical energy for operating the consumers 13, 13A-13E outside of a time period when the signal is present is stored, with the aid of the charging stage 13G, in the supercapacitor 13H. The charging stage 13G is connected at the input side to the first supply voltage VCC1 with respect to the first reference potential GND1, that is to say connected to the output of the contactless power transmission unit 11B. At the output side, it provides a second supply voltage VCC2 with respect to a second reference potential GND2, wherein the first and the second reference potentials GND1 and GND2 are identical, that is to say corresponding switching points are connected to one another.

The two supply voltages VCC1 and VCC2 may differ or be the same with regards to their value, which ultimately depends on the specifications of the consumers 13, 13A-13E to be supplied.

As soon as the second supply voltage VCC2 is sufficiently high, the consumers 13, 13A-13E begin to operate and are functionally available.

It has proven particularly advantageous in this context however, that the long-term energy storage unit 13F is designed to be controllable with the aid of the central microcontroller unit 13. Thus, e.g. the energy level of the stored energy (e.g. categorized into three value ranges, such as e.g. good, medium, low) can be transmitted to the microcontroller unit 13 with the aid of an energy status (signal) and, as a function thereof, the voltage supply for different consumers 13A-13E can be controlled selectively with the aid of an output enable control signal OE output by the microcontroller unit 13 to the long-term energy storage unit 13F, which is discussed in detail in connection with FIG. 9.

Figure 2:
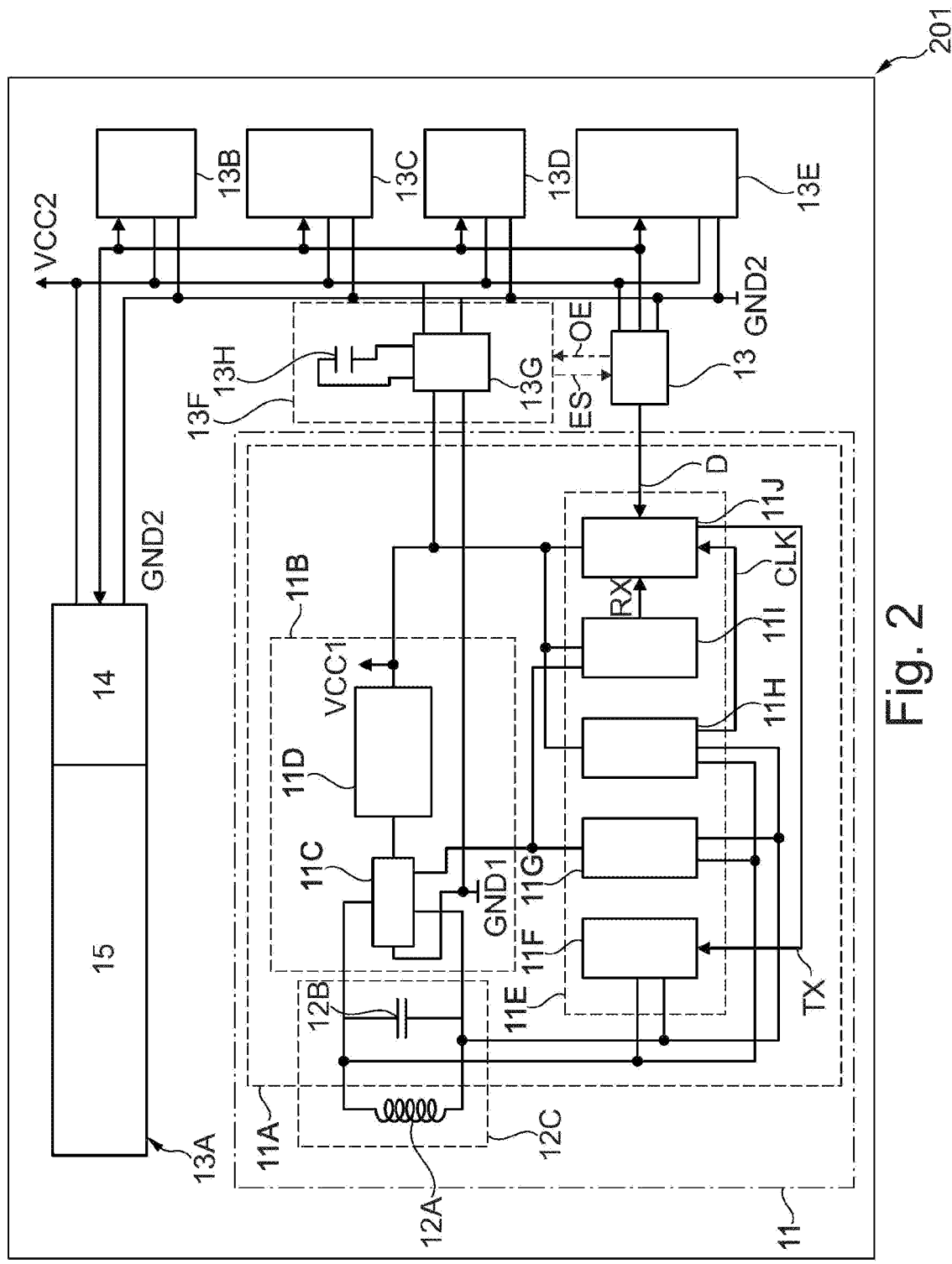
FIG. 2 schematically shows a block diagram of a shelf edge strip with a supply device.

Also, if it is assumed in the present explanation that the shelf labels 201-211 all have the same design, that is to say all comprise the consumers 13, 13A-13E shown in FIG. 2, it is made clear at this point that this does not have to be the case. Thus, for example, only a few shelf labels e.g. 201, 203, 204, 206, 207, 209 and 211 per shelf edge strip may be realized exclusively as a shelf label display. Other shelf labels, e.g. 202, 205, 208 and 210 could have no display unit 13A at all, but in return could comprise a camera unit 13E and each comprise a time-of-flight sensor unit 13C and ultimately, the last remaining shelf label 209 could only comprise a temperature sensor unit 13D. In principle however, any combination of the consumers 13A-13E may be provided for each shelf label 201-211 here. This may be realized by a selective hardware design of the respective consumers 13A-13E in the respective shelf label. This may also be realized such that a few or all types of consumers 13A-13E are implemented and can be enabled with the aid of control commands, that is to say can be activated using software (e.g. by the central microcontroller unit 13) and/or are available or even not available due to specific designs of the housing of the respective shelf labels.

A block diagram of one of the shelf edge strips 3 according to FIG. 1 is explained in the following on the basis of FIG. 3. The shelf label 403 is visualized representatively here, as all supply devices 401-403 are constructed identically.

The shelf edge strip 3 carries the conductor loops L which are fastened directly to it and were integrated into it. Corresponding to the position of the conductor loop L, the shelf label displays 207-211 positioned there—in the present case—are also illustrated and indicated. In contrast to FIG. 1, the electrical connection of the loop connectors C to an electronic circuit 18A of a second NFC interface 18 of the supply device 403 is also illustrated. Also, this second NFC interface 18 comprises similar components to the first NFC interface 11A, wherein here the fundamental difference consists in it being designed for generating and emitting the signal, that is to say comprising a transmission unit (not illustrated in detail). The second NFC interface 18 also comprises its own NFC controller (not illustrated). The second NFC interface 18 is designed, with the aid of the signal emitted by it, for contactlessly transmitting electrical energy to the shelf label displays 207-211 and for bidirectionally communicating data with the shelf label displays 207-211 activated by the said energy transmission.

The supply device 403 furthermore comprises an access point communication interface 19, which is designed for wireless communication with the access point 6 illustrated in FIG. 1 via the first wireless signals F1. To this end, the access point communication interface 19 comprises electronics (not illustrated in detail) designed therefor and an antenna configuration 19A, which can also comprise multiple antennas. To control the internal processes, such as also the energy supply to the shelf labels 207-211 and communication with the shelf labels 207-211, and communication with the access point 6, the supply device 403 comprises a control unit 20. The control unit 20 is realized with the aid of a microcontroller, which is connected to the second NFC interface 18 and the access point communication interface 19 via a bidirectional databus.

As can be seen by viewing in combination with FIG. 1, the individual supply devices 401-403 are supplied with electrical energy with the aid of a supply transmitter 21 (also referred to as a wireless energy source), which is designed to transmit electrical energy at a certain transmitting power, such as 5 W for example, to a receiver (that is, to one of the supply devices 401-403) with the aid of a focused or directional (second) wireless signal F2. Such a supply transmitter 21 also comprises a multiplicity of antennas 22 (in this case, six of them are illustrated), with the aid of which the direction of the energy transmission (ultimately the propagation of the second wireless signal F2) can be set relatively precisely so that the energy-transmitting second wireless signal F2 arrives precisely at the respective supply device 401-403. This energy transmission is known under the term "power over WiFi". It should also be mentioned at this point that the supply transmitter 21 can also be installed in the access point 6.

Figure 3:
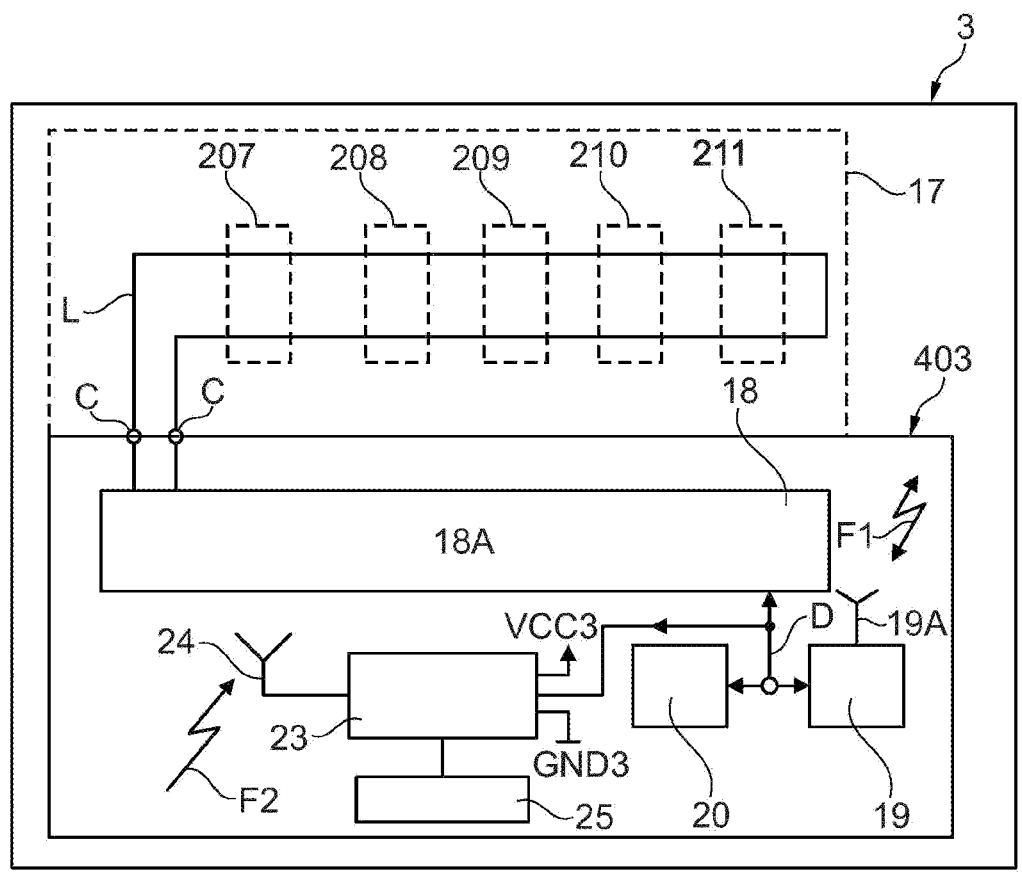
FIG. 3 schematically shows a block diagram of a shelf label display.

To be able to use this type of energy transmission, the supply device 403 illustrated in FIG. 3 comprises a supply receiver 23 suitable for receiving the second wireless signals F2, which is equipped with its antenna configuration 24 (which may comprise a plurality of antennas) and electronics (not illustrated in detail). The supply receiver 23 is designed to receive the second wireless signal F2 and to store the energy transmitted therewith in an internal, rechargeable electrical supply energy storage device 25 (e.g. chargeable battery, rechargeable battery or else "supercapacitor") and to generate a third supply voltage VCC3 in relation to a third reference potential GND3 therewith. Each of the supply devices 401-403 is operated using this internally provided third supply voltage VCC3.

During operation, the supply device 403 can query or monitor the state of charge of the internal supply energy storage device 25, for example with the aid of its control unit 20. As soon as the state of charge falls below a certain level, the control unit 20 can request a (re)charge with the aid of the first wireless signal F1. In the aforementioned proprietary time slot communication method, this may take place e.g. in the context of a status request by the access point 6. The result of this status request is received by the access point 6 and can be forwarded directly to the supply transmitter 21 or forwarded to the supply transmitter 21 by involving the server 5, depending on the implementation. Since the exact geographical position (the three-dimensional coordinates) of each of the supply devices 401-403 and their unique identifier is known in the system 1 (e.g. the server 5), the supply transmitter 21 can send the second wireless signal F2 in a precisely directed manner towards the position of the respective supply device 401-403 requesting charging. The second wireless signal F2 is received there, and the energy transmitted with the aid thereof is used to charge the internal supply energy storage device 25 there. This may also take place in particular if the remainder of the electronics of the supply device 403 are in the sleep state.

The "intelligent" shelf edge strips 3 described here are therefore designed, with the aid of the supply devices 401-403 installed in them, for contactless communication with the shelf label displays 201-211 installed on them and an access point 6 wirelessly assigned to them. Furthermore, the shelf edge strips 3 are designed for contactless energy provision in the sense of energy storage in the supply devices 401-403 installed in them for their own operation and for supplying energy to the respective shelf label display 201-211, specifically whilst the respective first NFC interface 11 is active with the aid of the signal. Furthermore, the shelf labels 201-211 are designed to autonomously supply energy to their individual consumers 13, 13A, 13B-13E even during a time period, during which the signal of the respective supply device 401-403 is not present or does not exist.

During operation of the system, the access point 6 can e.g. communicate image update data to the shelf label display 201 with the aid of the proprietary time slot communication method. The relevant supply device 401 changes at its wake-up time from the sleep state to the active state, detects its synchronism with the access point 6 and, as a consequence, that it is being addressed by the access point 6 to receive image update data. Subsequently, in the time slot provided for the supply device 401 (or a series of such time slots) these image update data are transmitted to the supply device 401 and at least temporarily buffer-stored. Then, the electronic components of the supply device 401 required for communication with the access point 6 are transferred back to the sleep state.

The supply device 401 can forward these image update data to the relevant shelf label display 201 in real time (that is to say synchronously with the communication with the access point 6) or with a time delay to receive the image update data (that is to say asynchronously with the communication with the access point 6). To this end, it activates its second NFC interface 18, generates and emits the signal via its conductor loop L, which activates the shelf labels 201-203 installed on the uppermost shelf edge strip 3, produces a communication connection to the shelf label display 201 and transmits the image update data to the shelf label display 201, where the received image update data are transferred to the display unit 13A and processed there to change the image content. During this entire process, all of the shelf labels 201-203 installed on the uppermost shelf edge strip use the signal in order to charge their long-term energy storage devices 13H. As soon as a completion notification from the shelf label display 201 arrives at the supply device 401, the supply device stops emitting the signal and all of the shelf labels 201-203 installed on the uppermost shelf edge strip 3 deactivate at least their first NFC interface 11 with the cessation of the energy transmission. Further activities of the consumers 13, 13A-13E of the respective shelf labels 201-203 are not affected by this deactivation and are continued by energy provision with the aid of the long-term energy storage device 13H.

The mechanical structure of the shelf edge strip 3, which likewise contributes to the energy-efficient operation of the system, is discussed below.

Figure 4:
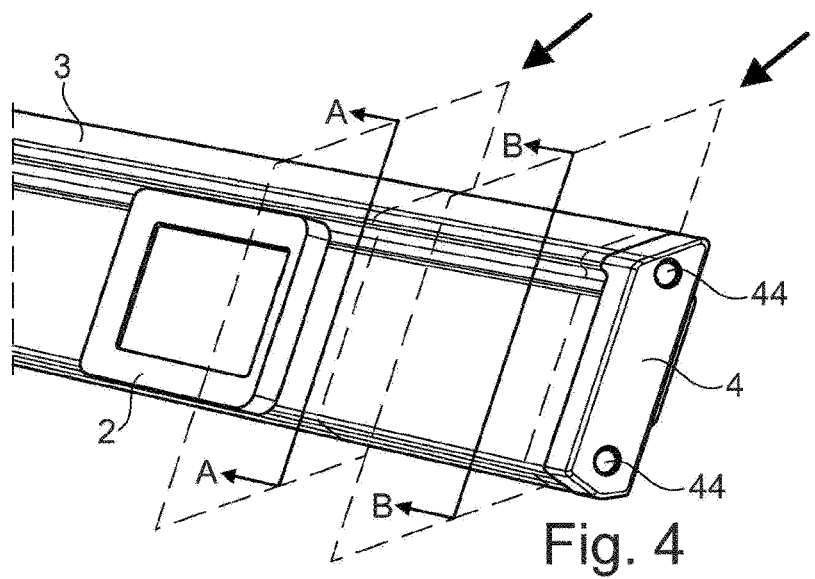
FIG. 4 schematically shows a perspective view of the shelf edge strip with a supply device.

FIG. 4 shows a shelf edge strip 3 with one of the shelf labels 201-211, which is designed as a shelf label display 2 and which is fastened to it. FIG. 4 furthermore shows a supply device 401-403, here labelled in an abbreviated manner with the reference number 4, inserted laterally into the shelf edge strip 3. The shelf edge strip 3 has a length of approx. 3 metres, a height of approx. 4.5 cm and a thickness of 1.2 cm, for example.

Figure 5:
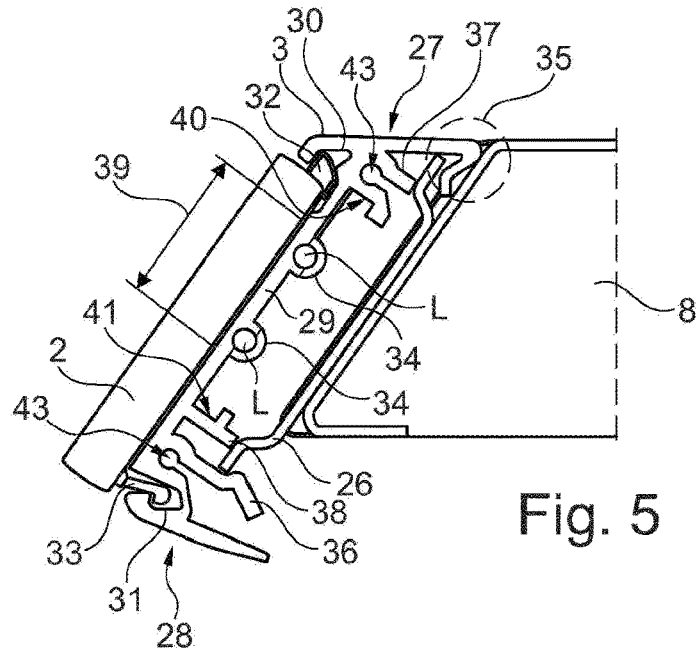
FIG. 5 schematically shows a cross section of the view according to FIG. 4 along the section plane A-A.

FIG. 5 shows a section through the shelf edge strip 3. According to the section plane A-A drawn in FIG. 4, this section runs transversely (normal to the front side of the shelf edge strip 3) through the shelf edge strip 3. Furthermore, by contrast to FIG. 4, a front part of a shelf 8 can also be seen, to which the shelf edge strip 3 is fastened with the aid of a top-hat rail 26 made from metal. The top-hat rail 26 forms a conductivity structure for creating defined damping ratios for the contactless energy transmission from the supply device 4 to the shelf label display 2 and for the contactless communication between the supply device 4 and the shelf label display 2. With the aid of the defined damping ratios, on the one hand, the energy transmission can be optimized and on the other hand, the communication can be carried out reliably, because the antenna LC circuit of the supply device 4 is tuned to these defined damping ratios. The top-hat rail 26 can be connected to the shelf 8 by adhesive bonding, riveting, clamping, plugging or screw connection, etc., which is not discussed in any more detail in the figures however.

The shelf edge strip 3 comprises a first fastening structure for fastening the shelf label display 2. The first fastening structure comprises a wall 29 running between a top region 27 and a base region 28 of the shelf edge strip 3. Analogously to the base and foot regions 27, 28, the wall 29 also runs along the entire shelf edge strip 3 and forms a shelf label plane on its wall front side orientated towards the shelf label display 2, against which plane the shelf label display 2 bears in a substantially flush manner by way of its rear wall. In addition to the wall, the first fastening structure comprises a first fastening groove 30, which is formed at the top region 27 and extends along the top region 27, and a second fastening groove 31, which is formed at the base region 28 and extends along the base region 28. The fastening grooves 30 and 31 are designed in such a manner that the shelf label 2 can be inserted in a latching manner into them using its fastening elements 32 and 33, so that the rear wall of the shelf label 2 is positioned so as to bear against the shelf label plane. The fastening elements 32 and 33 are positioned and formed accordingly and the housing of the shelf label 2 is dimensioned and shaped accordingly.

The shelf edge strip 3 furthermore comprises a second fastening structure for fastening the conductor loop L. Also, the second fastening structure comprises the wall 29, wherein two tubes 34 are formed on the wall rear side. The two tubes 34 are aligned parallel to one another and run at a defined distance of approx. 1 cm from one another located approximately along the entire length of the shelf edge strip 3. The two central axes thereof define a conductor loop plane, which runs at a defined first distance of approx. 2.5 millimetres parallel to the shelf label plane. The wall 29 here has a thickness of approx. 2 millimetres and the tubes 34 are at least partially offset into the wall 29, which allows a slightly smaller distance between the conductor loop plane and the shelf label plane, without the load-bearing capacity of the wall 29 suffering unnecessarily.

The shelf edge strip 3 furthermore comprises a third fastening structure for fastening the top-hat rail 26. The third fastening structure comprises two sub-structures, which are formed on one side at the top in a hanging device 35 for hanging the shelf edge strip 3 and on the other side at the bottom in a snap lip 36 for snapping in.

The third fastening structure furthermore comprises a first spacer element 37 positioned in the top region 27 and a second spacer element 38 positioned in the base region 28. The two spacer elements 37 and 38 are used for fixing and maintaining a defined second distance of the top-hat rail 26 from the conductor loop plane, wherein a substantially parallel orientation of the planar structure of the top-hat rail 26 to the conductor loop plane is also realized here. The two spacer elements 37 and 38 are orientated substantially at an angle of 90° away from the rear side of the wall and extend away from the wall 29 towards the top-hat rail 26, where they touch the top-hat rail 26 and ensure the intended position. In the present case, the top-hat rail 26 is positioned at the second distance of approx. 7 millimetres away from the conductor loop plane. The top-hat rail 26 itself has a thickness of approx. 1 millimetre. Its height is approximately 2.5 cm, adjacently to the top and bottom of which, edges also extend, which are each approx. 5 millimetres long and are offset by approx. 3 mm in a brim-like manner, with which edges the plastic body of the shelf edge strip 3 interacts. The length of the top-hat rail 26 corresponds approximately to the length of the shelf edge strip 3.

Furthermore, the outer extent of the coil 12A formed on the rear wall of the shelf label display 2 is shown in FIG. 5 by way of the dimension 39. Here, it can be seen clearly that the coil 12A bears flat against the shelf label plane and is arranged there in a manner corresponding to and even overlapping with the spatial extent of the conductor loop L, as measured in the direction of the height of the shelf edge strip 2.

The shelf edge strip 3 furthermore comprises a fourth fastening structure, which is used for fastening the supply device 4, in order to push the supply device 4 in at an end region (left or right end) of the shelf edge strip 3 between the wall 29 of the shelf edge strip 3 and the top-hat rail 26 fastened with the aid of the third fastening structure and to fix the supply device, so that the conductor loop connectors C of the conductor loop L available there are contacted with the supply device 4. For this purpose, the fourth fastening structure comprises a first insertion channel 40, which is formed on the rear side of the wall below the first spacer element 37 and is open towards the base region 28, and a second insertion channel 41, which is formed on the rear side of the wall above the snap lip 36 and is open towards the top region 27. The supply device 4 can be pushed into the two insertion channels 40 and 41 by way of its fastening rails 42, which can be seen in FIG. 6. In addition, the fourth fastening structure comprises round openings 43, one at the top end of the wall 29 and one at the bottom end of the wall 29, into which openings fastening screws 44 (see e.g. FIG. 6, but also 9 and 10) can be screwed from the side of the shelf edge strip 3 to connect the supply device 4 to the shelf edge strip 3 using screws.

Figure 6:
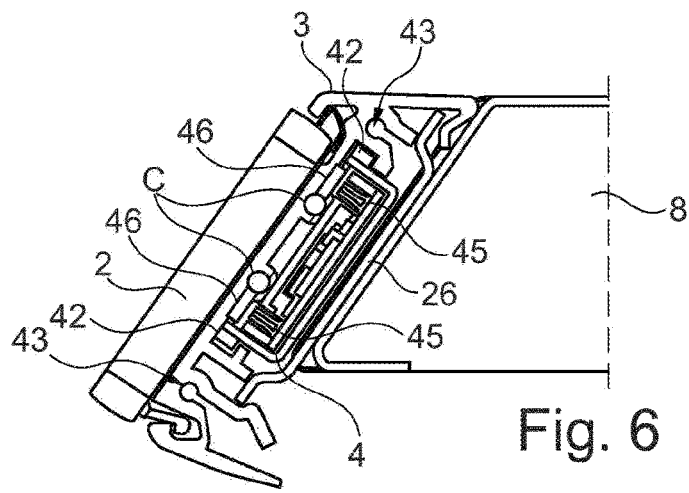
FIG. 6 schematically shows a cross section of the view according to FIG. 4 along the section plane B-B.

FIG. 6 shows a section through the shelf edge strip 3 according to the sectional plane B-B drawn in FIG. 4, which is orientated transversely (normal to the front of the shelf edge strip 3) through the shelf edge strip 3 and runs to the right of the sectional plane A-A at the point of the shelf edge strip 3 at which contact elements 45 of the supply device 4 are formed. For improved clarity, the multiplicity of reference numbers which do not directly relate to the fastening of the supply device 4 are omitted in FIG. 6.

Furthermore, in the present case, two contact surfaces 46 are provided, wherein each of the contact surfaces 46 is soldered to one of the loop connectors C. When the supply device 4 is pushed completely into the shelf edge strip 3, that is to say when the supply device is positioned in the desired position, the contact surfaces 46 are contacted with the contact elements 45, which are constructed as spring contacts, so that a connection to the conductor loop L is produced and this can be used as a constituent of the second NFC interface 18. However, in contrast to this design, in the case of a closer located positioning of the contact elements 45, it is possible to dispense with the contact surfaces 46, and the wire forming the conductor loop L can be contacted directly at the end regions of the wire provided as conductor loop connectors C.

It should also be mentioned that at the other end of the shelf edge strip 3, more precisely at the other end of the tubes 34, the wire of the conductor loop L runs in one piece from the one tube 34 to the other tube 34.

Figure 7:
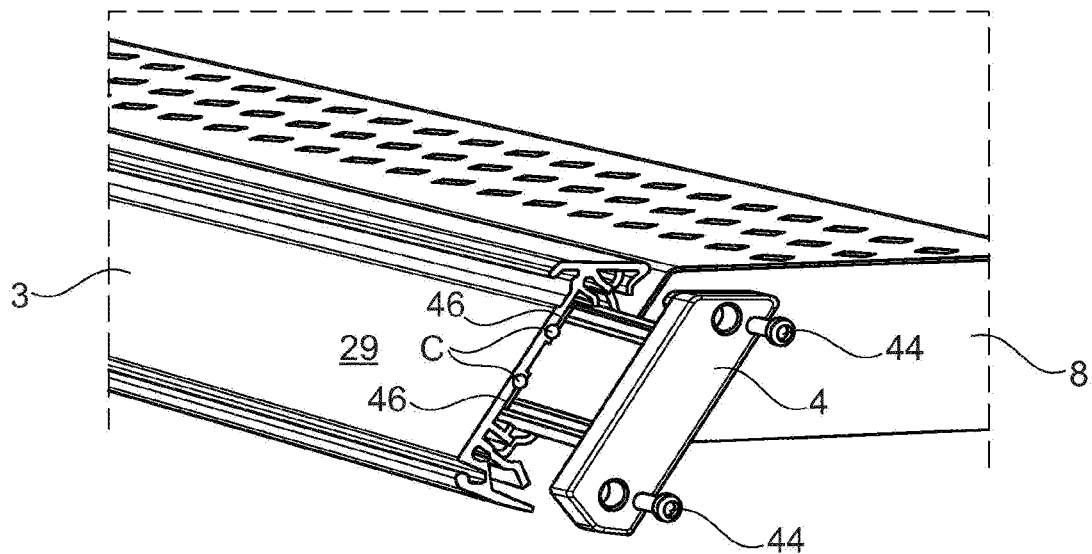
FIG. 7 schematically shows a view of the shelf edge strip with only partially inserted supply device.
Figure 8:
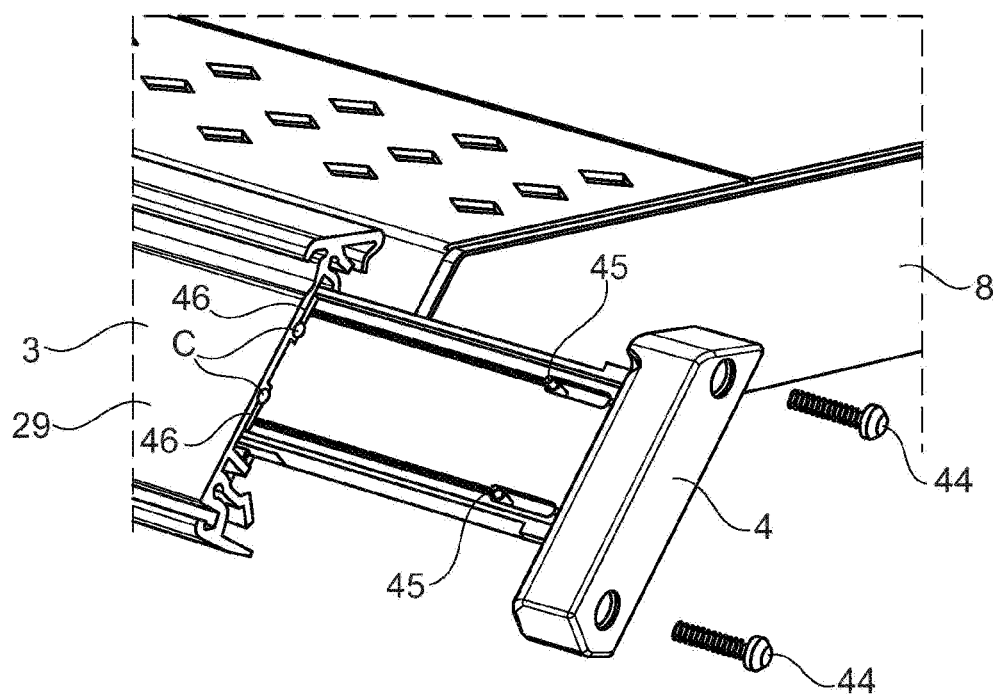
FIG. 8 schematically shows a view similar to FIG. 7 with contacting components of the supply device.

Finally, FIGS. 7 and 8 are discussed, wherein FIG. 7 shows the supply device 4 which is only slightly pulled out of the shelf edge strip 3 and FIG. 8 also shows the contacting components 45 in a slightly changed illustration. Here also, the majority of reference numbers were omitted, so as not to overload the illustrations.

Figure 9:
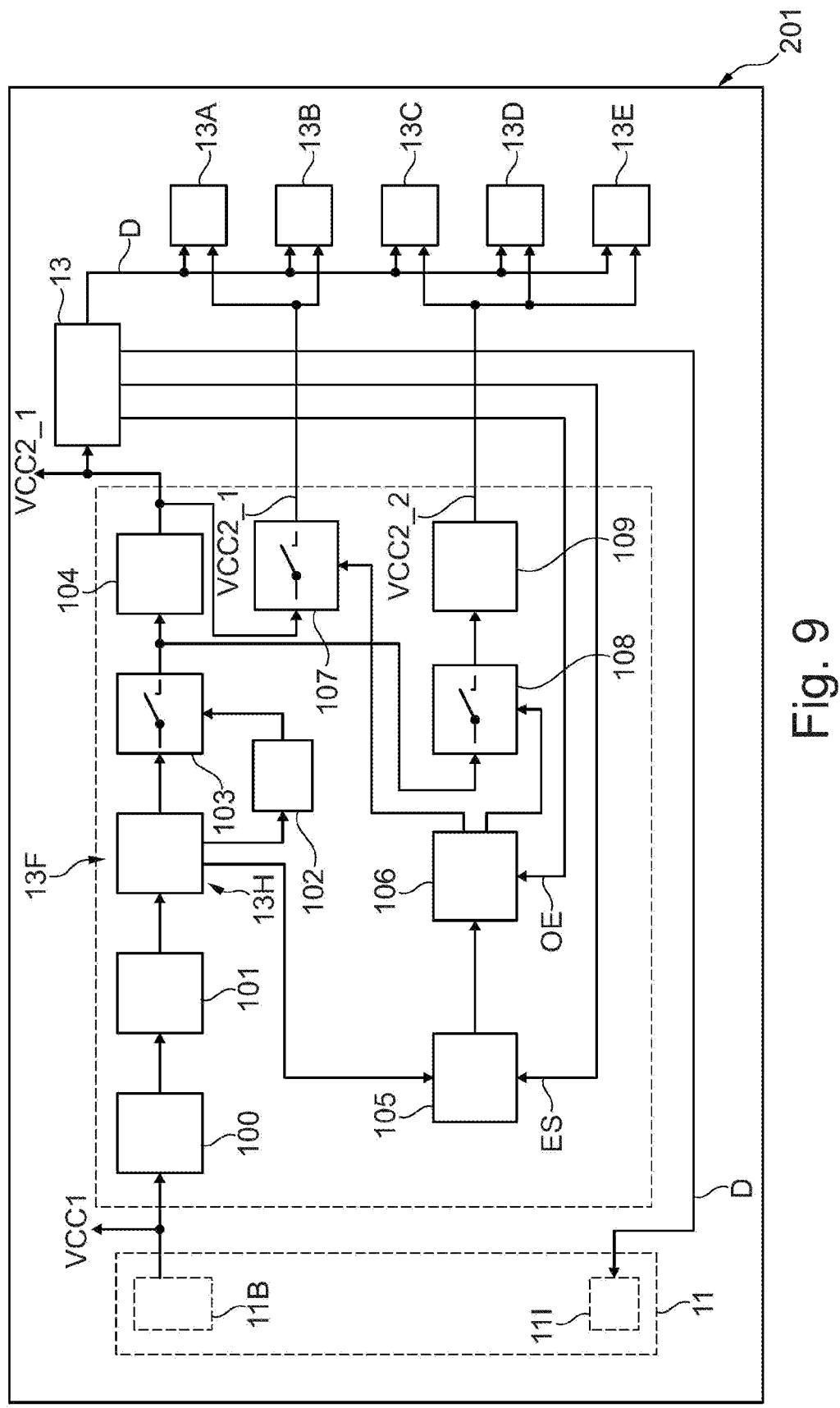
FIG. 9 schematically shows details of a long-term energy storage unit of the shelf label.

The long-term energy storage unit 13F, termed unit 13F for short in the following, is explained in more detail in a developed embodiment in FIG. 9. As can already be seen from FIG. 2, the unit 13F is fed by the power transmission unit 11B, which generates the first supply voltage VCC1 at the coil 12A on the output side when the (NFC) signal is present. The first supply voltage VCC1 may fluctuate as a function of the quality of the NFC signal.

At the input side, the unit 13F comprises a first voltage regulator stage 100, which provides a regulated DC voltage with a defined value for the following charger and current limiter stage 101. The stage 101 limits loads and ensures that the charging current is limited, so that the NFC signal is not loaded too strongly and does not break down. This may be important, so that other shelf labels, which are installed on the same shelf edge strip 3, can likewise be supplied and also the communication with them can be carried out. It furthermore ensures that the supercapacitor 13H is charged correctly (in accordance with its specification).

The unit 13F furthermore comprises a cold-start stage 102, which is designed for actuating a first electronic switching stage 103. The cold-start stage 102 ensures that the electronics connected downstream of the first switching stage 103 are only supplied from the supercapacitor 13H when the charge thereof has reached a minimum level, so that a continuous operation of the downstream-connected electronics is possible, specifically without the voltage at the supercapacitor 13H dropping so severely due to loading with the downstream-connected electronics, that the downstream-connected electronics would stop their operations again. If the minimum required charge level is reached, the cold-start stage 102 connects a second voltage regulator stage 104 with the aid of the first switching stage 103 to the supercapacitor 13H, at which e.g. a voltage of maximum 2.2 volts can be picked up. With the aid of the second voltage regulator stage 104, a higher (by a factor) supply voltage VCC2_1 of approx. 3 volts is generated, which is required for the operation of the central microcontroller unit 13, and output to the central microcontroller unit 13, whereupon the same takes up its operation. In this state, the microcontroller unit 13 can already exchange data D with the digital control unit 11J and thus also decode commands, which are received via the first NFC interface 11, and if appropriate also execute the same or receive or transmit data D.

Furthermore, the unit 13F comprises an energy threshold value detection stage 105, which is designed to divide the energy stored in the supercapacitor 13H e.g. into three categories and to communicate this information e.g. as an energy status ES (e.g. in the form of "good", "medium" or "poor") to the microcontroller unit 13.

As a function of the present energy status ES, the microcontroller unit 13 decides which of the consumers 13A-13E can be supplied with its respective supply voltage VCC2_1 or VCC2_2, wherein account is also taken of whether the respective consumers 13A-13E are to be supplied at all (sensibly), which may result e.g. from the received data D or commands. The microcontroller unit 13 therefore decides which consumers 13A-13E can draw current from the supercapacitor 13H. Thus, e.g. the supply voltage VCC2_1 is only enabled for the display unit 13A if the energy status "good" is present. Only then can a change of the image content of the screen 15 take place, and thereafter the electrical supply of the display unit 13A is stopped, in order to keep the energy consumption from the supercapacitor 13H as low as possible.

To realize the switching on and off of the individual supply voltage VCC2_1 or VCC2_2 to the individual consumers 13A-13E, the unit 13F comprises an output control stage 106, which is controlled with the aid of an output enable control signal OE of the microcontroller unit 13. It converts the output enable control signal OE into a switching signal for two further switching stages 107 and 108.

With the aid of the second switching stage 107, e.g. the supply voltage VCC2_1 provided for the microcontroller unit 13 can therefore also be supplied to the consumers 13A-13B, whereas for the consumers 13C-13E, the supply voltage VCC2_2, with a value (of e.g. 5 volts) differing from the supply voltage VCC2_1, which value is generated with the aid of a third voltage regulator stage 109, can be connected with the aid of the third switching stage 109.

This procedure can of course also be applied in relation to each consumer 13A-13E individually, if in accordance with the number of consumers, a corresponding number of switching stages and, if appropriate, also a corresponding number of voltage regulators are provided.

Finally, it is once more pointed out that the figures previously described in detail are only concerned with exemplary embodiments, which can be modified in many different ways by the person skilled in the art, without departing from the scope of the invention. For the sake of completeness, it is also pointed out that the use of the indefinite article "a" or "an" does not mean that the relevant features cannot also be present multiple times.

The invention claimed is:

1. A method for operating an electronic shelf label system (1), including the steps of providing:
   one or more shelf labels (201-211) fastened to shelf edge strips (3),
   the one or more shelf labels (201-211) being designed such that they can be supplied with energy in a contactless manner, and
   wherein the shelf edge strip (3) comprises a supply device (401-403) for contactlessly supplying energy to the one or more shelf labels (201-211) fastened thereon, and a rechargeable long-term energy storage device (13H), and
   the shelf edge strip (3) comprises at least one conductor loop (L) that is a constituent of the supply device (401-403) of the shelf edge strip (3) and wherein the conductor loop (L) is used for emitting a signal, which can be generated by the supply device (401-403), for the purpose of the suppling of energy to the one or more shelf labels (201-211) positioned on the shelf edge strip (3), in a manner corresponding to the conductor loop (L);
   the supply device (401-403) generating the signal via the conductor loop (L) and transmitting electrical energy to at least one or more shelf labels (201-211) positioned corresponding to the conductor loop (L), the respective shelf labels (201-211) storing the electrical energy in the rechargeable long-term energy storage device (13H) for use during its operation outside of the time period when the signal is present;
   wherein at least one of the one or more shelf labels (201-211) of the system (1) comprises at least one data collecting electric consumer (13A-13E), which causes electrical power consumption outside of the time period where the signal is present, and
   wherein, each of the one or more shelf labels (201-211), which comprises such a data collecting consumer, provides the power consumed by the data collecting consumer when operated outside of the time period where the signal is present, with the aid of the electrical energy stored in the long-term energy storage device (13H),
   wherein in addition to energy supply, the supply device (401-403) sets up communication with one or more selected of the one or more shelf labels (201-211)

with the aid of the signal, and, during the time period when the signal is present, each of the one or more shelf labels (201-211) analyzes the signal and checks whether it is selected for communication with the supply device (401-403), wherein each of the one or more shelf labels (201-211) first establishes its electrical supply with the aid of the signal when the signal occurs, and subsequently analyzes the signal and checks whether it is selected for communication with the supply device (401-403), wherein, further according to the method, the respective data collecting consumer (13A-13E) generates and stores data (D) during its activity consuming electrical power stored in the long-term energy storage device (13H), and transmits these data (D) during the time period where the signal is present, from the one or more shelf labels (201-211) to the supply device (401-403) during communication with the supply device (401-403).

2. The method according to claim 1, wherein each of the one or more shelf labels (201-211), which determines that it is not selected for communication with the supply device (401-403), reduces its activities to using the signal during the entire remaining time period when the signal is present so as to store electrical energy until the long-term energy storage device (13H) is charged as completely as possible.

3. The method according to one of the preceding claims, wherein the respective data collecting consumer (13A-13E) processes data (D), during its activity, causing the electrical power consumption outside of the time period when the signal is present, which data were previously transmitted during communication of the supply device (401-403) with the particular one or more shelf labels (201-211) comprising the data collecting consumer (13A-13E), from the supply device (401-403) to the particular one or more shelf labels (201-211) and saved there.

4. An electronic shelf label system (1), comprising:

shelf edge strips (3) and one or more shelf labels (201-211) fastened thereto, wherein the one or more shelf labels (201-211) are designed such that they can be supplied with energy in a contactless manner, and wherein each shelf edge strips (3) comprises a supply device (401-403) for contactlessly supplying energy to the one or more shelf labels (201-211) fastened to it and each of the shelf edge strips (3) comprises at least one conductor loop (L), wherein the conductor loop (L), which is a constituent of the supply device (401-403) of the shelf edge strip (3), is used for emitting a signal, which can be generated by the supply device (401-403) during a time period when the signal is present, for the purpose of the said supply of energy to the one or more shelf labels (201-211) positioned on the shelf edge strip (3) in a manner corresponding to the conductor loop (L);

wherein the one or more shelf labels (201-211) comprise a rechargeable long-term energy storage device (13H);

wherein the one or more shelf labels (201-211) are designed for storing the err transmitted to them from the supply device (401-403), with the aid of the signal in the long-term err storage device (13H), and also for using the err stored in the long-term err storage device (13H), for their operation outside of the time period where the signal is present;

wherein at least one of the one or more shelf labels (201-211) comprises at least one electric data collection consumer (13A-13E), which causes electrical power consumption outside of the time period where the signal is present, and the at least one of the one or more shelf labels (201-211), which comprises such a data collection consumer, covers the power consumption of the data collection consumer of the at least one of the one or more shelf labels (201-211), outside of the time period where the signal is present, with the aid of the electrical energy stored in the long-term energy storage device (13H);

wherein in addition to emitting the signal for the purpose of energy supply, the supply devices (401-403) are designed to set up communication with one or more shelf labels (201-211) with the aid of the signal, and each of the one or more shelf labels (201-211) is designed to analyze the signal and check, during the time period when the signal is present, whether the respective at least one of the one or more shelf labels (201-211) is selected for communication with the supply device (401-403);

wherein each of the one or more shelf labels (201-211) is further designed for first establishing its electrical supply with the aid of the signal when the signal occurs, and for subsequently analyzing the signal and checking whether it is selected for communication with the supply device (401-403), and wherein the data collecting consumer (13A-13E) is designed to generate and to store data (D) outside of the time period when the signal is present and wherein the at least one of the one or more shelf labels (201-211) comprises electronics, which are designed such that the data (D) stored by the consumer (13A-13E) are available for them during the time period when the signal is present and that these data (D) can be transmitted to the supply device (401-403) during communication with the supply device (401-403).

5. The system (1) according to claim 4, wherein each of the one or more shelf labels (201-211) is designed, following the detection that it is not selected for communication with the supply device (401-403), to reduce the activity of its electronics to using the signal during the entire remaining time period when the signal is present and to store electrical energy until the long-term energy storage device (13H) is charged as completely as possible.

6. The system (1) according to claim 4 or 5, wherein the one or more shelf labels (201-211) comprises electronics, which are designed such that stored data (D) are available for the data collecting consumer (13A-13E), which data were communicated from the supply device (401-403) to the at least one of the one or more shelf labels (201-211) comprising the consumer (13A-13E) during communication with the supply device (401-403), and wherein the data collecting consumer (13A-13E) is designed to process these data (D) outside of the time period when the signal is present.

7. The system (1) according to claim 4, wherein each of the one or more shelf labels (201-211) comprises a first NFC interface (11) and wherein each supply device (401-403) comprises a second NFC interface (18) for the said energy supply of the one or more shelf labels (201-211) and communication between the supply device (401-403) and the one or more shelf labels (201-211) and the conductor loop (L) is a constituent of the second NFC interface (18).

8. The system (1) according to claim 4, wherein the supply devices (401-403) are designed to be supplied with energy in a contactless manner and to store the energy transmitted to them in a contactless manner in a chargeable supply energy storage device (25) and to use the energy stored there for their own operation and for the contactless energy supply of the one or more shelf labels (201-211).

\* \* \* \* \*